(12) United States Patent
Park

(10) Patent No.: US 11,862,078 B2
(45) Date of Patent: Jan. 2, 2024

(54) IMAGE DISPLAY DEVICE AND OPERATION METHOD THEREOF

(71) Applicant: LG ELECTRONICS INC., Seoul (KR)

(72) Inventor: Jungkyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/790,613

(22) PCT Filed: Jan. 3, 2020

(86) PCT No.: PCT/KR2020/000087
§ 371 (c)(1),
(2) Date: Jul. 1, 2022

(87) PCT Pub. No.: WO2021/137336
PCT Pub. Date: Jul. 8, 2021

(65) Prior Publication Data
US 2023/0042596 A1 Feb. 9, 2023

(51) Int. Cl.
*G09G 3/3208* (2016.01)
*G09G 3/00* (2006.01)
(Continued)

(52) U.S. Cl.
CPC ........... *G09G 3/3208* (2013.01); *G01K 3/005* (2013.01); *G06F 1/1601* (2013.01); *G09G 3/035* (2020.08); *G09G 2320/041* (2013.01)

(58) Field of Classification Search
CPC .... G06F 1/1601; G09G 3/3208; G09G 3/035; G09G 3/20; G09G 2320/041; G01K 3/005; G09F 9/30
See application file for complete search history.

(56) References Cited

U.S. PATENT DOCUMENTS 10,304,417 B2 * 5/2019 Park ................. G09G 5/005
11,114,067 B2 * 9/2021 Hong ................ G09G 3/035
(Continued)

FOREIGN PATENT DOCUMENTS

JP 2007-25321 A 2/2007
JP 2007025321 A * 2/2007
(Continued)

*Primary Examiner* — Doon Y Chow
(74) *Attorney, Agent, or Firm* — Birch, Stewart, Kolasch & Birch, LLP

(57) ABSTRACT

The present invention relates to an image display device and an operation method therefor. An image display device according to an embodiment of the present invention comprises a housing, a roller disposed inside the housing, and a plurality of pixels. The image display device includes: a display panel that can be wound on or unwound from the roller; and a control unit for controlling the operation of the roller so that the display panel rolls up or rolls down. The control unit can check the temperature of the display panel, and apply a main signal to at least one of the plurality of pixels according to the temperature of the display panel when the temperature of the display panel is less than a reference temperature, and control the operation of the roller when the temperature of the display panel is the reference temperature or higher. Various other embodiments are also possible.

18 Claims, 27 Drawing Sheets

(51) Int. Cl.
  *G01K 3/00*      (2006.01)
  *G06F 1/16*      (2006.01)

(56)          References Cited

U.S. PATENT DOCUMENTS 11,576,270 B2 *   2/2023   Rha ...................... G06F 1/1652
  2018/0190187 A1   7/2018   Hack et al.

FOREIGN PATENT DOCUMENTS

KR     10-2011-0107670 A      10/2011
  KR         20110107670 A  *   10/2011
  KR     10-2018-0026944 A       3/2018
  KR     10-2018-0134236 A      12/2018

* cited by examiner

IMAGE DISPLAY DEVICE AND OPERATION METHOD THEREOF

CROSS-REFERENCE TO RELATED APPLICATIONS

This application is the National Phase of PCT International Application No. PCT/KR2020/000087, filed on Jan. 3, 2020, all of which is hereby expressly incorporated by reference into the present application.

TECHNICAL FIELD

The present disclosure relates to an image display apparatus and an operating method thereof.

BACKGROUND ART

An image display apparatus is an apparatus having a function for displaying an image which can be watched by a user. Recently, with the development of the information society, demands for the image display apparatus are increased in various forms. Various image display apparatuses, such as a liquid crystal display (LCD), a plasma display panel (PDP), an electroluminescent display (ELD), and a vacuum fluorescent display (VFD) have been recently researched and used.

Among them, an image display apparatus using an organic light emitting diode (OLED) has advantages in that a brightness characteristic and a viewing angle characteristic are excellent compared to an image display apparatus such as an LCD, and the image display apparatus can be implemented in an ultra thin type because a backlight unit is not required.

Furthermore, a flexible display panel using the OLED is formed on a substrate made of a material having flexibility, such as polyimide. Accordingly, an image display apparatus that is wound on or unwound from a roller can be implemented by using the flexible display panel because the image display apparatus can be bent or wound on the roller.

Meanwhile, a plastic material, such as polyimide, has a physical property that the plastic material is firmly hardened in a low-temperature environment having a designated temperature or less. For example, if a heating apparatus is not driven in a state in which an outdoor temperature is below zero (e.g., −5° C.), an indoor temperature may drop to less than room temperature (e.g., 5° C.). In such a low-temperature environment, a plastic substrate that constitutes a flexible display panel may be gradually firmly hardened.

In this case, in the case of an image display apparatus including the flexible display panel, an operation of winding the flexible display panel on a roller or unwinding the flexible display panel wound on the roller is frequently performed. If an operation, such as unwinding the flexible display panel wound on the roller in the state in which the plastic substrate has been hardened, etc. is performed, there is a problem in that there is a good possibility that the flexible display panel is damaged.

SUMMARY

An object of the present disclosure is to solve the aforementioned problem and another problem.

Another object is to provide an image display apparatus capable of preventing damage to a flexible display panel in a low-temperature environment having a designated temperature or lower and an operating method thereof.

An image display apparatus according to an embodiment of the present disclosure for achieving the object may include a housing, a roller disposed within the housing, a display panel including a plurality of pixels and wound on or unwound from the roller, and a controller configured to control an operation of the roller so that the display panel is rolled up or rolled down. The controller may be configured to check a temperature of the display panel, apply a main signal to at least one of the plurality of pixels based on the temperature of the display panel when the temperature of the display panel is less than a reference temperature, and control an operation of the roller when the temperature of the display panel is the reference temperature or higher.

Meanwhile, an operating method of an image display apparatus according to an embodiment of the present disclosure may include checking a temperature of a display panel included in the image display apparatus, applying a main signal to at least one of a plurality of pixels included in the display panel based on the temperature of the display panel when the temperature of the display panel is less than a reference temperature, and controlling an operation a roller disposed within the housing so that the display panel is rolled up or rolled down when the temperature of the display panel is the reference temperature or higher.

ADVANTAGEOUS EFFECTS

Effects of the image display apparatus according to the present disclosure are described as follows.

According to at least one embodiment of the present disclosure, damage to the display panel can be prevented because the display panel hardened in a low-temperature environment can be softened before an operation of the roller is controlled.

Furthermore, according to at least one embodiment of the present disclosure, a user satisfaction level can be improved because the display panel can maintain the best state despite a change in the surrounding environment.

An additional scope of the applicability of the present disclosure will become evident from the following detailed description. However, various changes and modifications within the spirit and scope of the present disclosure may be evidently understood by those skilled in the art. Accordingly, it should be understood that the detailed description and a specific embodiment, such as a preferred embodiment of the present disclosure, are merely given as examples.

DETAILED DESCRIPTION

Figure 1A:
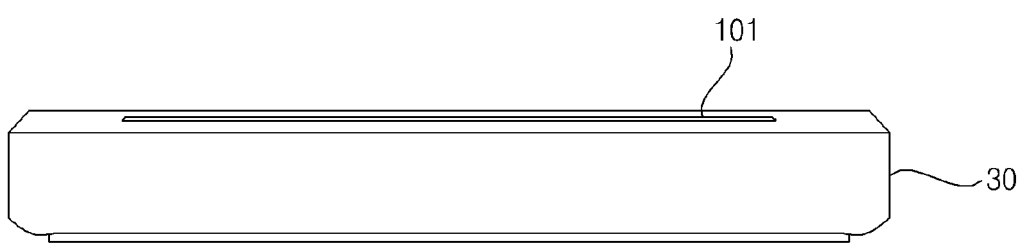
FIGS. 1a to 1c are diagrams illustrating an image display apparatus including a rollable display according to an embodiment of the present disclosure.

Hereinafter, the present disclosure is described more specifically with reference to the drawings. In the drawings, a portion not related to the description is not illustrated in order to clarify and briefly describe the present disclosure. The same reference numeral is used to denote the same or a very similar part through the specification.

The suffixes of elements used in the following description, such as a "module" and a "unit", are assigned by taking into consideration only the ease of writing this specification, but, in themselves, are not particularly given distinct meanings and roles. Accordingly, the "module" and "unit" may be interchangeably used.

It is to be understood that in this application, a term, such as "include" or "have", is intended to indicate the existence of a characteristic, number, step, operation, element, or component or a combination of them in the specification and does not exclude the existence of one or more other characteristics, numbers, steps, operations, elements, or components or a combination of them or the possible addition of them.

Furthermore, in this specification, terms, such as a first and a second, may be used to describe various elements, but these elements are not limited by such terms. Such terms are used to only distinguish one element from another element.

Figure 1B:
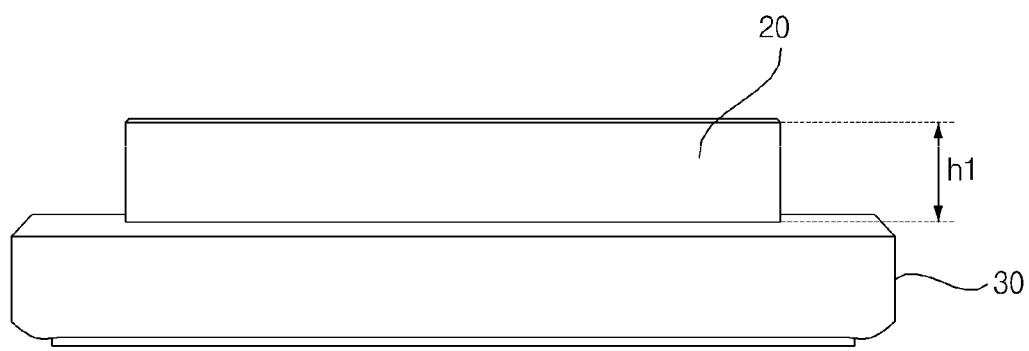
Figure 1C:
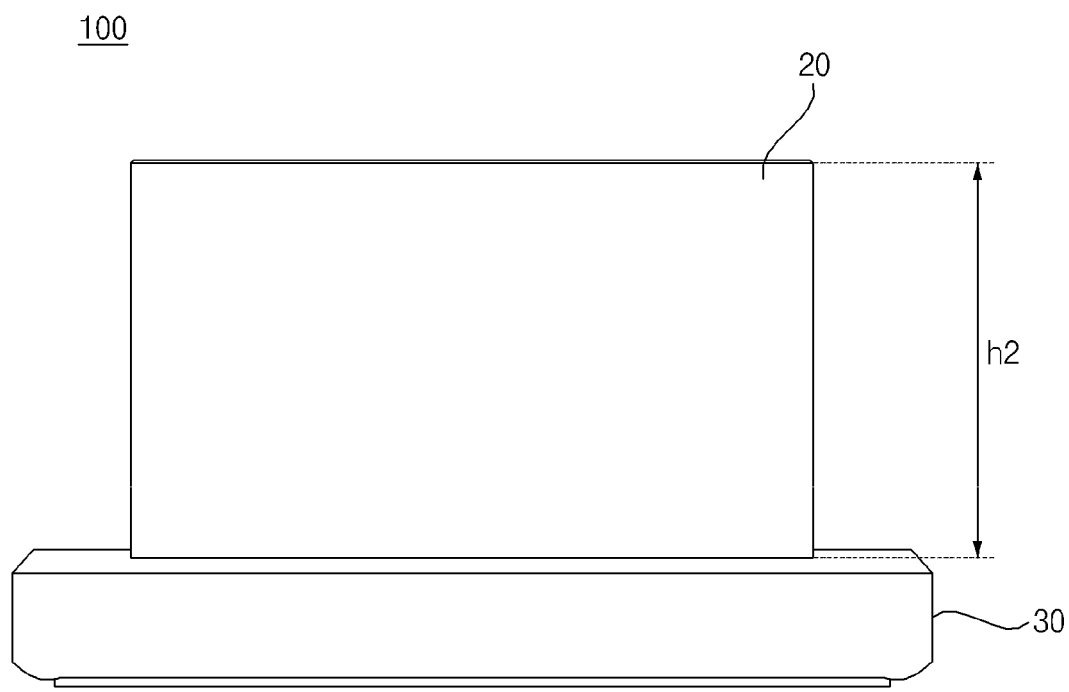

FIGS. 1a to 1c are diagrams illustrating an image display apparatus including a rollable display according to an embodiment of the present disclosure.

Referring to FIGS. 1a to 1c, the image display apparatus 100 may be one that processes and outputs an image. The image display apparatus 100 is not specially limited to any apparatus which can output a screen corresponding to an image signal, such as TV, a notebook computer, or a monitor.

The image display apparatus 100 may receive a broadcast signal, may perform signal processing on the broadcast signal, and may output the signal-processed broadcast image. When the image display apparatus 100 receives a broadcast signal, the image display apparatus 100 may correspond to a broadcast reception apparatus.

The image display apparatus 100 may wirelessly receive the broadcast signal through an antenna, or may receive the broadcast signal in a wired way through a cable.

For example, the image display apparatus 100 may receive a ground wave broadcast signal, a satellite broadcast signal, a cable broadcast signal, an Internet Protocol Television (IPTV) broadcast signal, etc.

The image display apparatus 100 may include a display 20 and a housing 30.

The housing 30 may include an internal space. At least a part of the display 20 may be disposed within the housing 30.

An opening part 101 may be formed in one surface of the housing 30. At least a part of the display 20 may be exposed to the outside of the housing 30 through the opening part 101. In this case, a degree that at least a part of the display 20 is exposed to the outside of the housing 30 may be adjusted if necessary.

The display 20 may display an image. For example, the display 20 may display an image through at least some area that belongs to the entire area of the display 20 and that is exposed through the opening part 101.

The display 20 may be a rollable display including a flexible display panel. For example, the display 20 may include an organic light-emitting panel consisting of OLEDs.

A roller 143 (FIG. 11a) on which the rollable display is wound and a motor (not illustrated) that rotates the roller may be disposed within the housing 30. In this case, the display 20 may be rolled up or rolled down as the roller is rotated, and the size of an area that belongs to the entire area of the display 20 and that is exposed to the outside of the housing 30 may be adjusted through the rolling up or down of the display 20.

The image display apparatus 100 may adjust the size of an area that belongs to the entire area of the display 20 and that is exposed to the outside of the housing 30 depending on a mode.

As in FIG. 1a, in the image display apparatus 100, the display 20 may be wound on the roller 143 disposed within the housing 30 so that the display 20 is not exposed to the outside of the housing 30 through the opening part 101.

For example, when power of the image display apparatus 100 is off or in a zero view mode, the display 20 may not be exposed to the outside of the housing 30 through the opening part 101, and power may not be supplied to the display 20. In this case, the zero view mode may mean a mode in which the display 20 is not exposed to the outside of the housing 30 and only some elements (e.g., the audio output unit 285 in FIG. 12) of the image display apparatus 100 operate.

Meanwhile, as in FIG. 1B, the display 20 is rolled up as the roller 143 is rotated, and thus an area that belongs to the entire area of the display 20 and that corresponds to a first height h1 may be exposed to the outside of the housing 30. In this case, the area corresponding to the first height h1 may correspond to some area of the display 20.

For example, in a line view mode, the image display apparatus 100 may display an image through an area that belongs to the entire area of the display 20, that is exposed to the outside of the housing 30, and that corresponds to the first height h1. In this case, the line view mode may mean a mode in which only some of the entire area of the display 20 is exposed to the outside of the housing 30.

Meanwhile, as in FIG. 1c, the display 20 is rolled up as the roller 143 is rotated, and thus an area that belongs to the entire area of the display 20 and that corresponds to a second height h2 may be exposed to the outside of the housing 30. In this case, the area corresponding to the second height h2 may correspond to the entire area of the display 20.

For example, in a full view mode, the image display apparatus 100 may display an image through the entire area of the display 20 that is exposed to the outside of the housing 30. In this case, the full view mode may mean a mode in which the entire area of the display 20 is exposed to the outside of the housing 30.

FIGS. 2 to 11 are diagrams illustrating examples of elements included in the image display apparatus according to various embodiments of the present disclosure.

Figure 2:
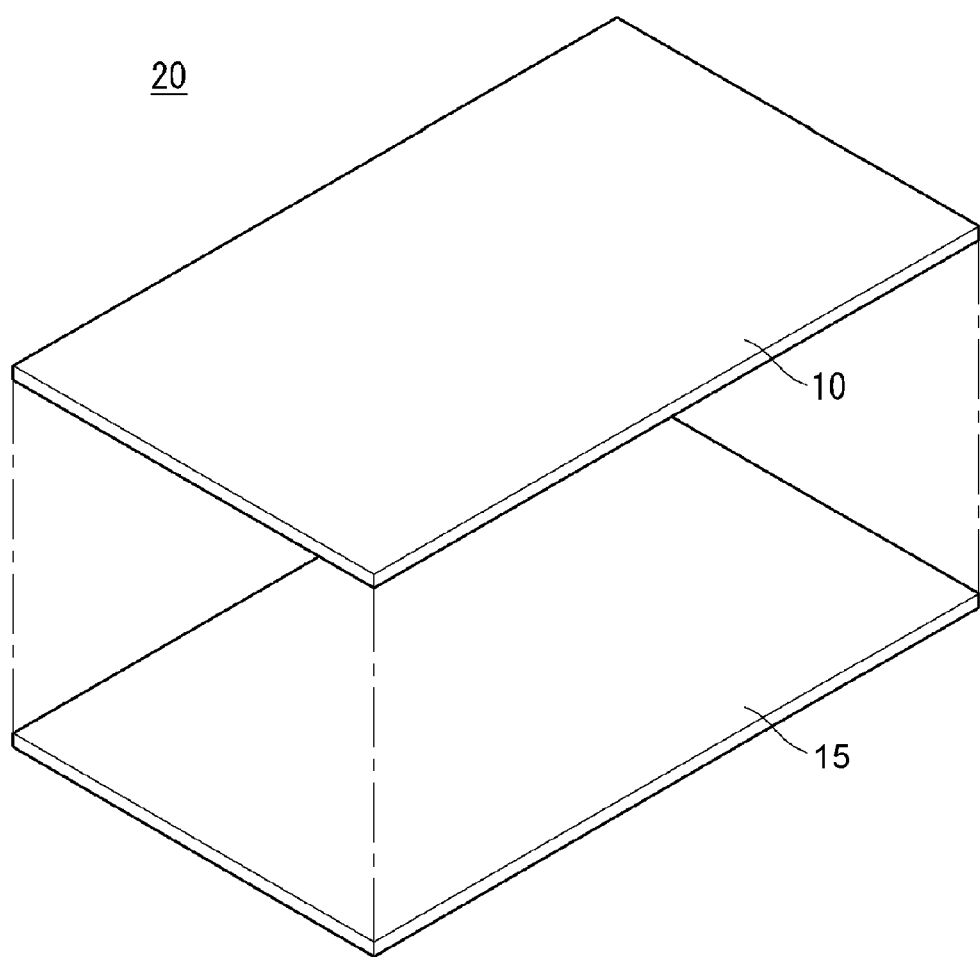
FIGS. 2 to 11c are diagrams illustrating examples of elements of the image display apparatus according to various embodiments of the present disclosure.

Referring to FIG. 2, the display 20 may include a display panel 10 and a plate 15. The display panel 10 may be flexible. For example, the display panel 10 may be an organic light-emitting display panel including OLEDs.

The display panel 10 may have a front surface on which an image is displayed. The display panel 10 may have a rear surface that faces the front surface. The front surface of the display panel 10 may be covered with a light transmissive material. For example, the light transmissive material may be synthetic resin or a film.

The plate 15 may be fastened or attached to the rear surface of the display panel 10. The plate 15 may include a metal material. The plate 15 may be named a module cover 15, a cover 15, a display panel cover 15, a panel cover 15, an apron 15, etc.

Figure 3:
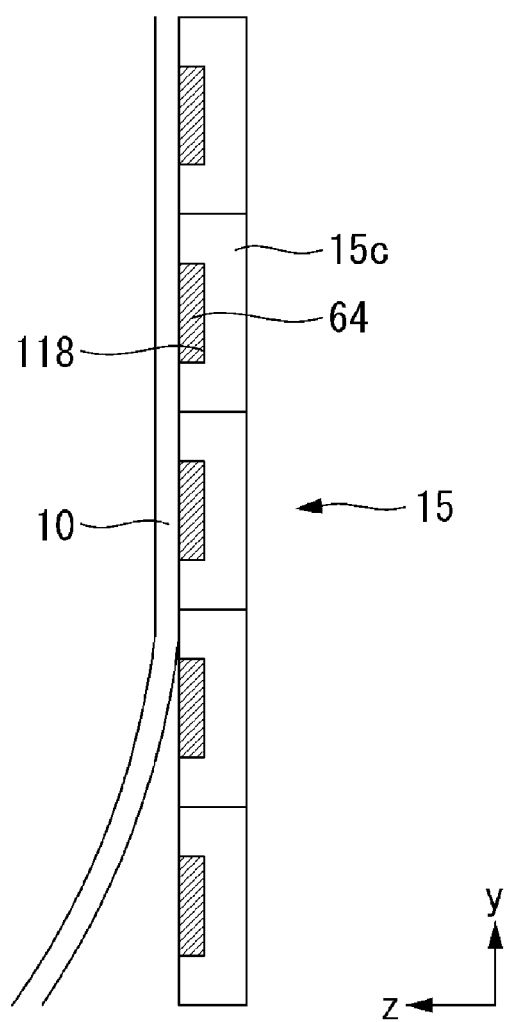

Referring to FIG. 3, the plate 15 may include a plurality of segments 15c. A magnet 64 may be disposed within a recess 118 of the segment 15c. The recess 118 may be disposed in a surface that faces the display panel 10 of the segment 15c. The recess 118 may be disposed in the front surface of each segment 15c. The magnet 64 may not protrude to the outside of the segment 15c because the magnet 64 is accommodated in the recess 118. The display panel 10 may be flat without being crumbled although the display panel comes into contact with the segment 15c.

Figure 4:
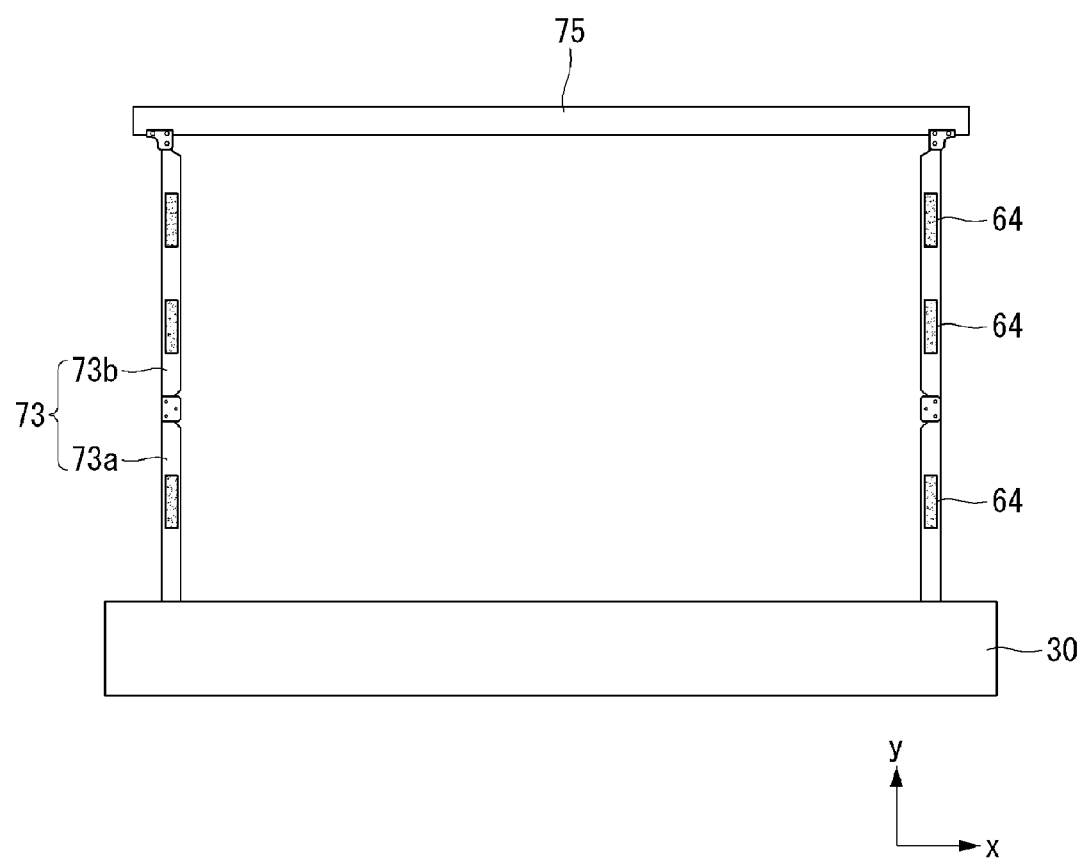

Referring to FIG. 4, a plurality of magnets 64 may be disposed on a link 73. For example, at least one magnet 64 may be disposed on a first arm 73a, and at least one magnet 64 may be disposed on a second arm 73b. The plurality of magnets 64 may be spaced apart from each other.

Figure 5:
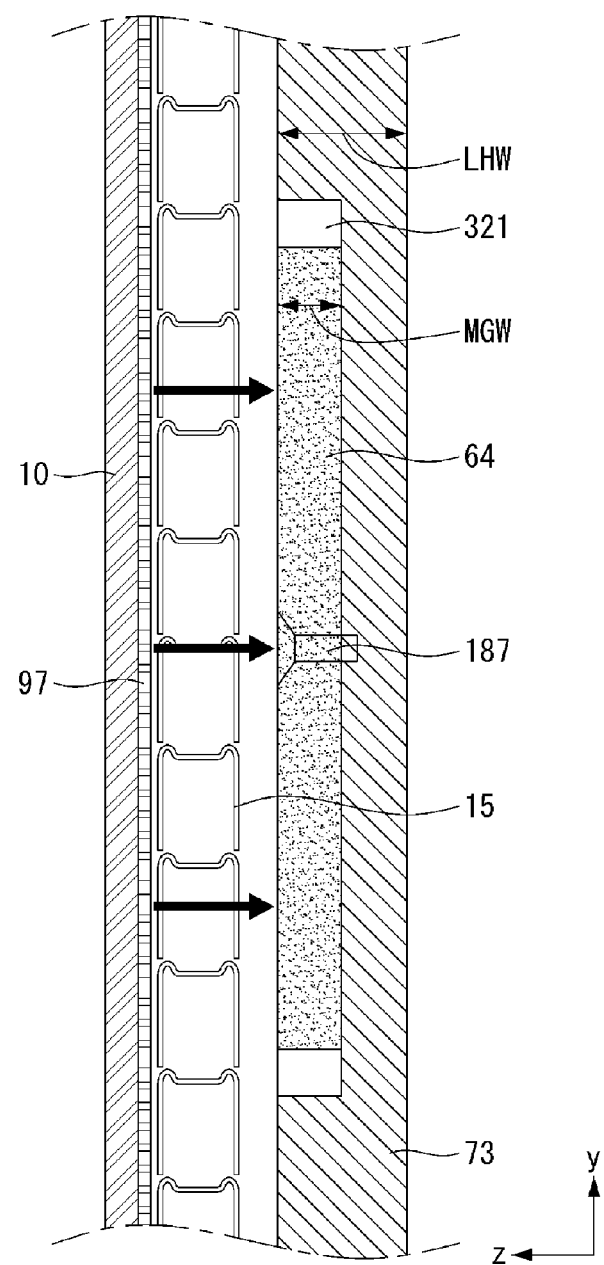

Referring to FIG. 5, the magnet 64 may be disposed in a recessed part 321 formed in the link 73. The recessed part 321 may have a shape that is recessed into the link 73. The magnet 64 may be coupled with the link 73 through at least one screw 187.

A width LHW that the recessed part 321 is recessed into the link 73 may be the same as or greater than a thickness MGW of the magnet 64. If the thickness MGW of the magnet 64 is greater than the width LHW of the recessed part 321, the display panel 10 and the module cover 15 may not be closely attached to the link 73. In this case, the display panel 10 may be crumbled or may not be flat.

A panel protection part 97 may be disposed on the rear surface of the display panel 10. The panel protection part 97 can prevent damage to the display panel 10 attributable to friction with the module cover 15. The panel protection part 97 may include a metal material. The panel protection part 97 may have a very thin thickness. For example, the panel protection part 97 may have a thickness of about 0.1 mm.

Attraction between the panel protection part 97 and the magnet 64 may occur because the panel protection part 97 includes the metal material. Accordingly, the module cover 15 disposed between the panel protection part 97 and the link 73 can be closely attached to the magnet 64 although the module cover 15 does not include a metal material.

Figure 6:
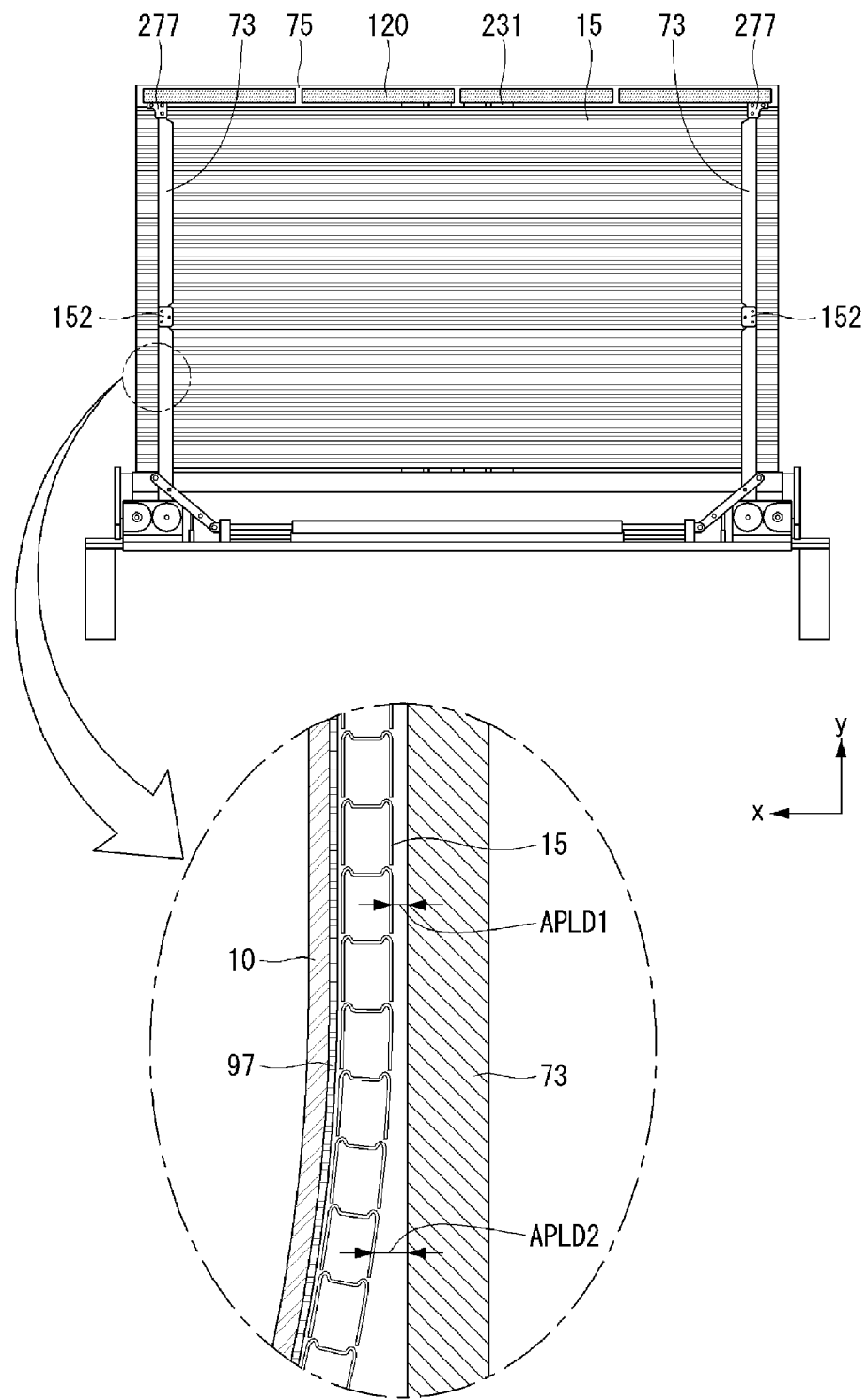

Referring to FIG. 6, the module cover 15 can be closely attached to the link 73 by an upper bar 75 on the upper side thereof and a guide bar 234 (refer to FIG. 11a) on the lower side thereof. A part that belongs to the link 73 and that is between the upper bar 75 and the guide bar 234 may not be closely attached to the module cover 15. Alternatively, a central part of the link 73 may not be closely attached to the module cover 15. The central part of the link 73 may be near an arm joint 152. In this case, a distance APRD1 or APLD2 between the module cover 15 and the link 73 may not be uniform. In this case, the display panel 10 may be bent or crooked.

Figure 7:
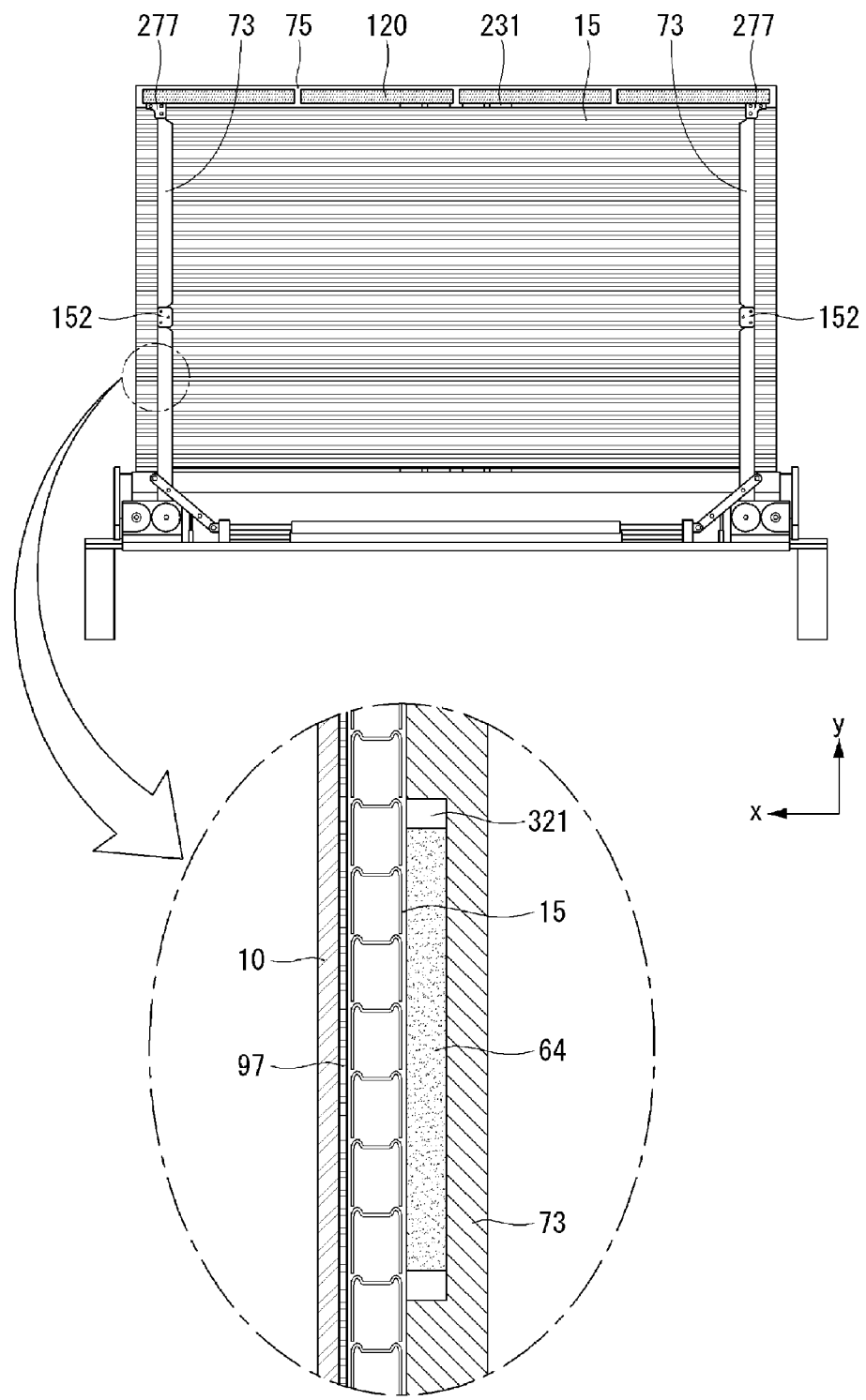

Referring to FIG. 7, if the magnet 64 is disposed on the recessed part 321 of the link 73, the module cover 15 may be simultaneously attached to the magnet 64 because the magnet 64 attracts the panel protection part 97. That is, the central part of the link 73 may be closely attached to the module cover 15.

Figure 8:
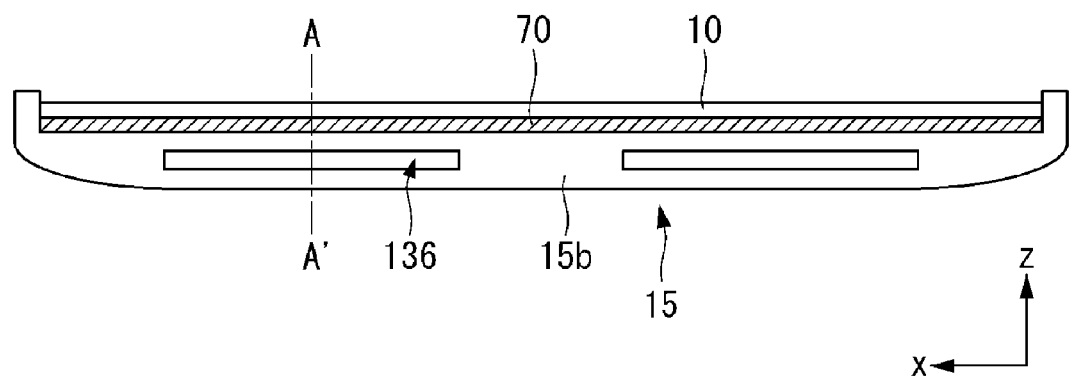
Figure 8:
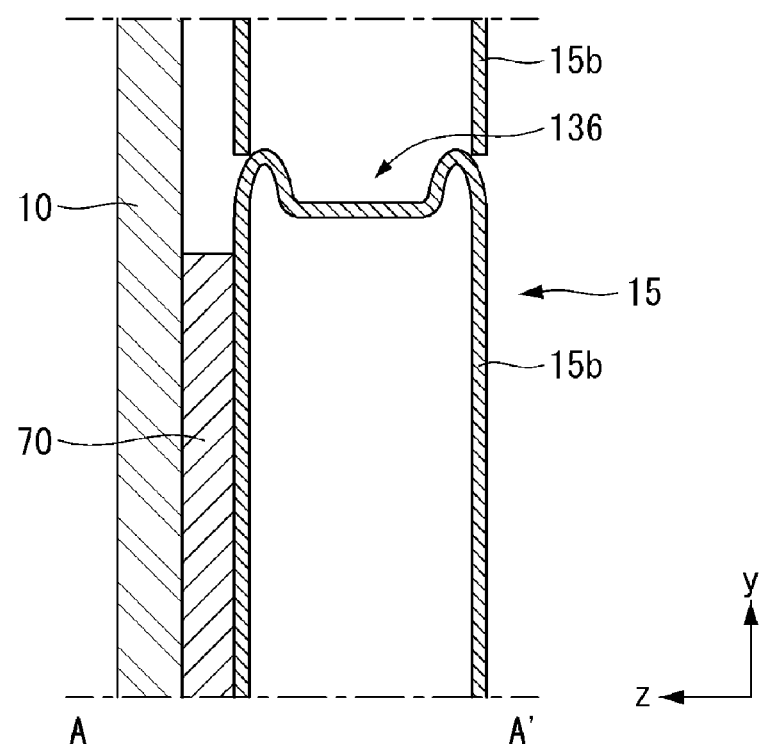

Referring to FIG. 8, a bead 136 may be formed on the top of the segment 15b. The bead 136 may have a shape that is recessed into the segment 15b. The bead 136 may have a shape recessed in a −y axis direction. For example, the bead 136 may be formed by pressing the segment 15b. The bead 136 may be formed in plural on the segment 15b. The plurality of beads 136 may be spaced apart from each other. The beads 136 can improve the stiffness of the segment 15b. The beads 136 can prevent that a shape of the segment 15b is deformed by an external impact.

Figure 9:
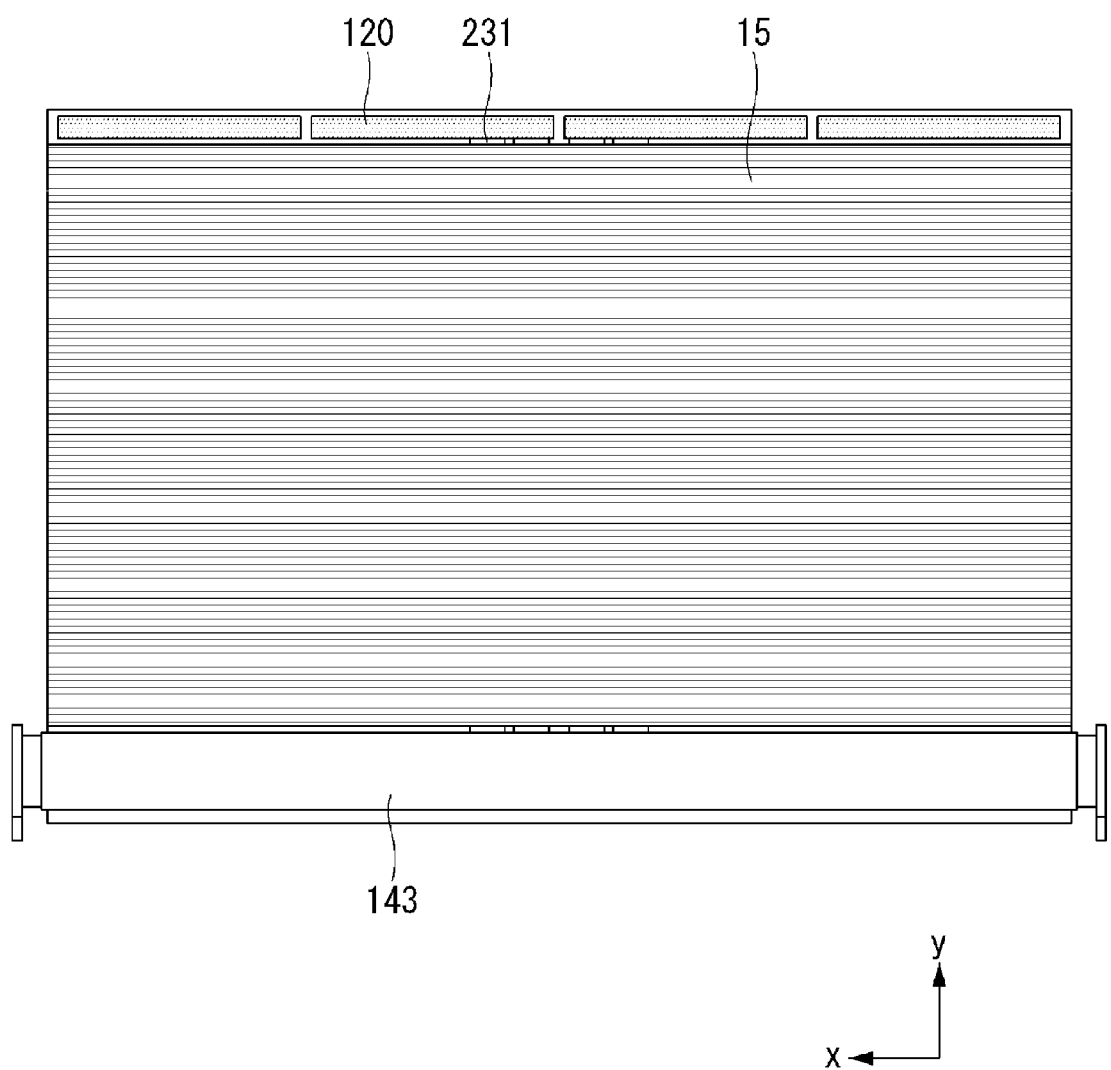

Referring to FIG. 9, a source PCB 120 may be disposed over the module cover 15. Upon rolling up or rolling down, a location of the source PCB 120 may be changed along with a movement of the module cover 15. An FFC cable 231 may be disposed at a central part of the module cover 15 on the basis of a first direction. The FFC cable 231 may be disposed at both ends of the module cover 15 on the basis of the first direction.

Figure 10:
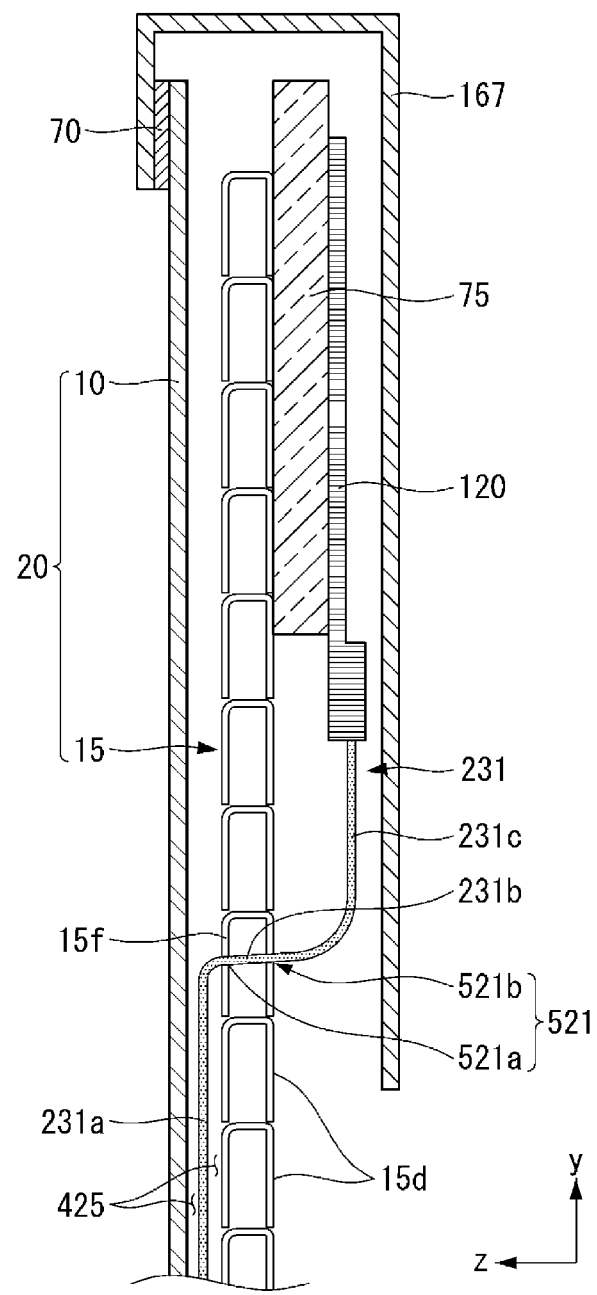

Referring to FIG. 10, a top case 167 may cover the source PCB 120 and the upper bar 75 in addition to the display panel 10 and the module cover 15. The upper bar 75 may have one surface coupled with the rear surface of the module cover 15 and may have the other surface coupled with the source PCB 120. The upper bar 75 may be fixed to the module cover 15, and may support the source PCB 120.

Figure 11A:
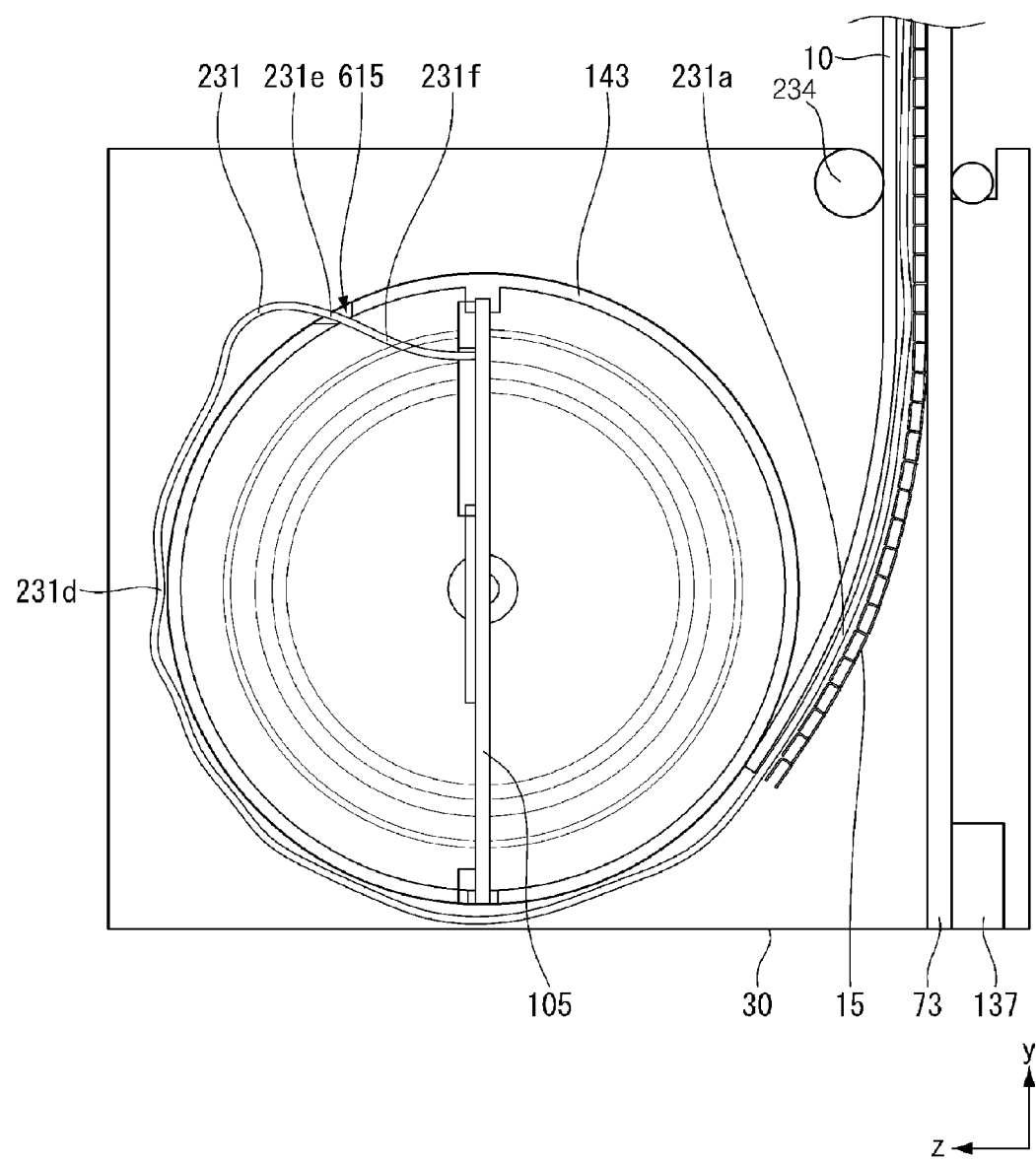

The bottom of the FFC cable 231 may be connected to a timing controller board 105 (refer to FIG. 11a) within the panel roller 143 (refer to FIG. 11a). The FFC cable 231 may be wound on or unwound from the panel roller 143 along with the display unit 20.

A part of the FFC cable 231 may be disposed between the display panel 10 and the module cover 15. A part that belongs to the FFC cable 231 and that is disposed between the display panel 10 and the module cover 15 may be named a first part 231a. The first part 231a may be disposed in a recessed part 425 in which a plurality of segments 15d is formed. Alternatively, the first part 231a may be accommodated in the recessed part 425 that is formed by the plurality of segments 15d.

A part of the FFC cable 231 may penetrate a segment 15f. A part that belongs to the FFC cable 231 and that penetrates the segment 15f may be named a second part 231b. The segment 15f may include a first hole 521a formed in the front surface and a second hole 521b formed in the rear surface. The first hole 521a and the second hole 521b may be connected to form one hole 521. The hole 521 may penetrate the segment 15f in a third direction. The second part 231b may pass through the hole 521. The hole 521 may be name a connection hole 521.

The top of the FFC cable 231 may be electrically connected to the source PCB 120. A part of the FFC cable 231 may be disposed in the rear surface of the module cover 15. A part that belongs to the FFC cable 231 and that is disposed in the rear surface of the module cover 15 may be named a third part 231c. The third part 231c may be electrically connected to the source PCB 120.

The third part 231c may be covered by the top case 167. Accordingly, the third part 231c may not be exposed to the outside.

Referring to FIG. 11a, the FFC cable 231 may be connected to the timing controller board 105 mounted on the panel roller 143. A through hole 615 may be formed in the panel roller 143. The FFC cable 231 may be connected to the timing controller board 105 through the through hole 615.

The through hole 615 may be disposed on one side of the panel roller 143, and may penetrate an outer circumference part of the panel roller 143. The FFC cable 231 may be connected to one side of the timing controller board 105 through the through hole 615.

Although the FFC cable 231 is disposed on the outer circumference of the panel roller 143, the connection of the FFC cable 231 with the timing controller board 105 can be maintained due to the through hole 615. Accordingly, the FFC cable 231 may not be twisted because the FFC cable is rotated along with the panel roller 143.

A part of the FFC cable 231 may be wound on the panel roller 143. A part that belongs to the FFC cable 231 and that is wound on the panel roller 143 may be named a fourth part 231*d*. The fourth part 231*d* may come into contact with an outer circumference surface of the panel roller 143.

A part of the FFC cable 231 may pass through the through hole 615. A part that belongs to the FFC cable 231 and that passes through the through hole 615 may be named a fifth part 231*e*.

The bottom of the FFC cable 231 may be electrically connected to the timing controller board 105. A part of the FFC cable 231 may be disposed within the panel roller 143. A part that belongs to the FFC cable 231 and that is disposed within the panel roller 143 may be named a sixth part 231*f*. The sixth part 231*f* may be electrically connected to the timing controller board 105.

Figure 11B:
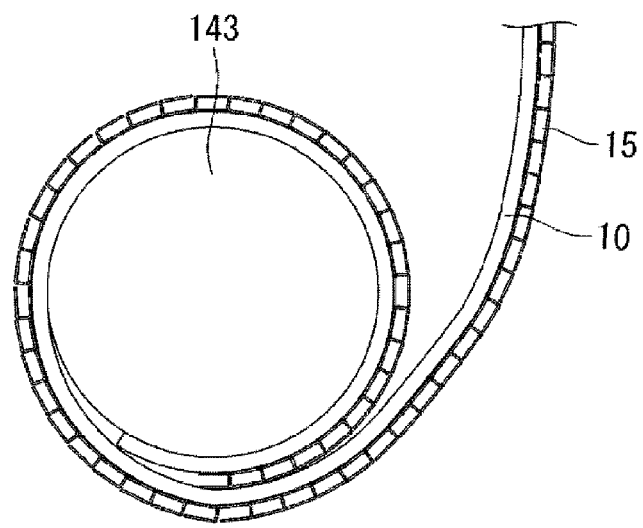
Figure 11C:
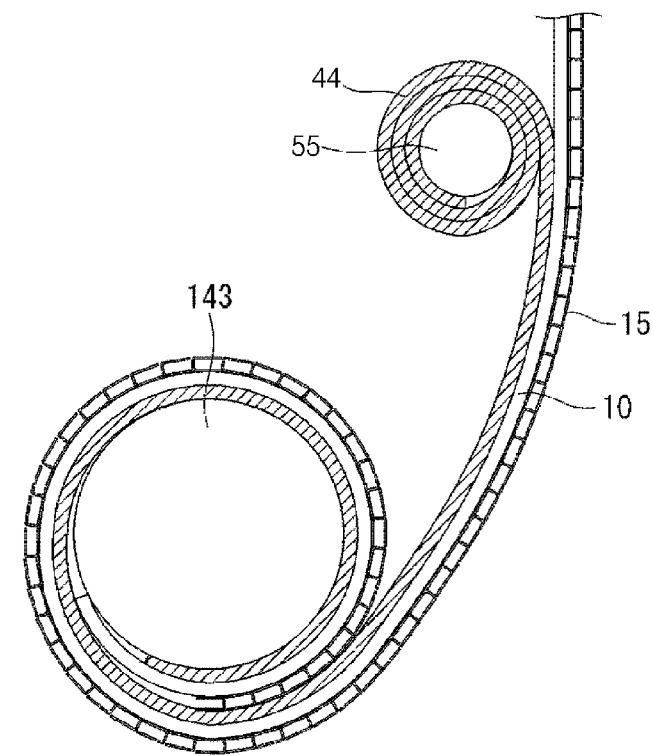

Referring to FIGS. 11*b* and 11*c*, the module cover 15 may be coupled with the rear of the display panel 10. The module cover 15 may be wound on or unwound from the panel roller 143 that elongates along with the display panel 10.

Referring to FIG. 11*b*, when the display panel 10 and the module cover 15 are wound on the panel roller 143, the display panel 10 may be damaged because the front surface of the display panel 10 comes into contact with the rear surface of the module cover 15.

Referring to FIG. 11*c*, when the display panel 10 and the module cover 15 are wounded on the panel roller 143 along with a protection sheet 44, the protection sheet 44 may be disposed between the display panel 10 and the module cover 15. That is, damage to the display panel 10 can be prevented because the front surface of the display panel 10 does not come into contact with the rear surface of the module cover 15 due to the protection sheet 44 that comes into contact with the front surface of the display panel 10.

For example, the protection sheet 44 may include non-woven fabric. For example, the protection sheet 44 may include a polyethylene foam material. For example, the thickness of the protection sheet 44 may be 0.3 to 0.5 mm.

Figure 12:
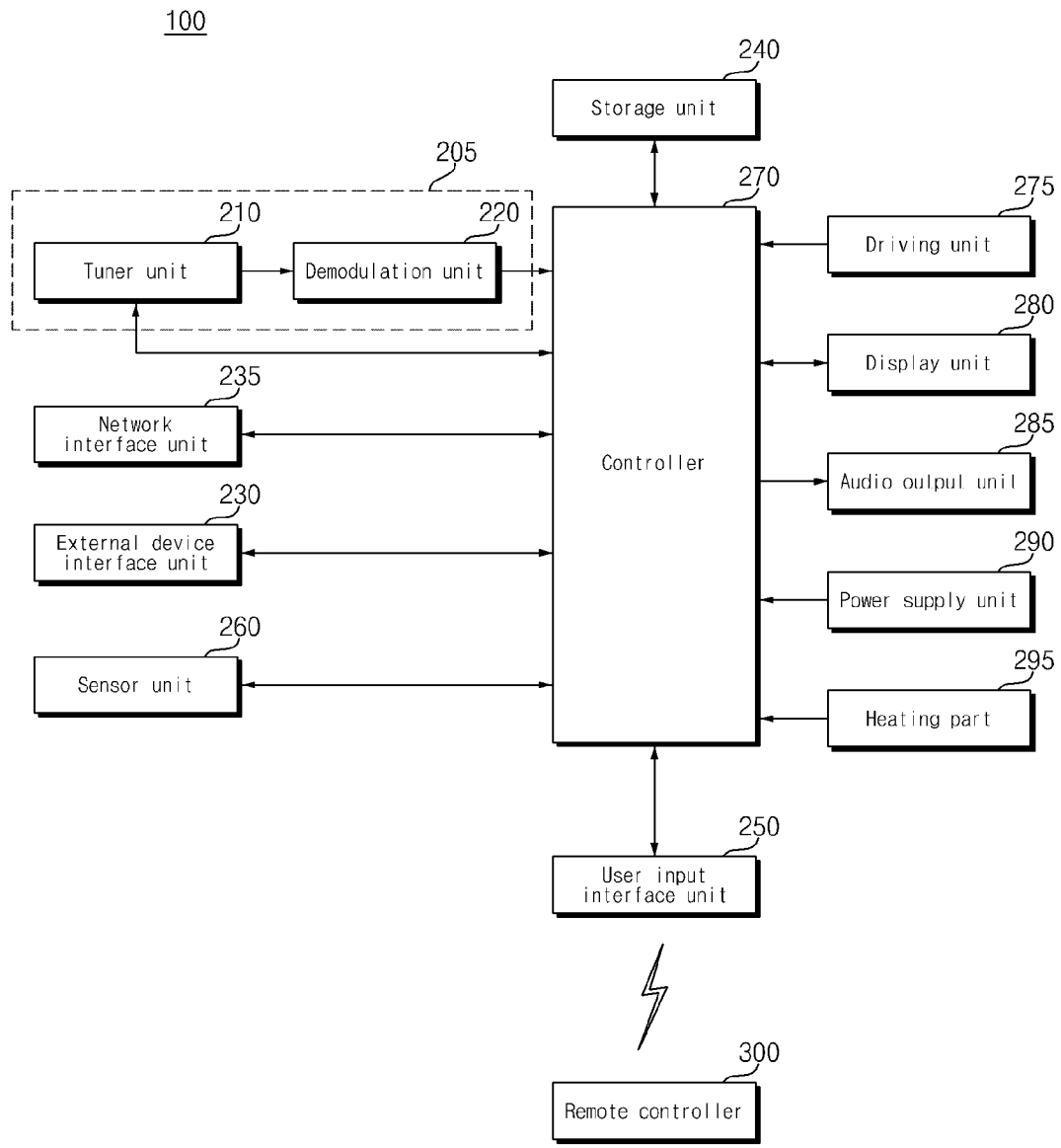
FIG. 12 is an example of an internal block diagram of the image display apparatus according to an embodiment of the present disclosure.

FIG. 12 is an example of an internal block diagram of the image display apparatus according to an embodiment of the present disclosure.

Referring to FIG. 12, the image display apparatus 100 may include a broadcast reception unit 205, an external device interface unit 230, a network interface unit 235, a storage unit 240, a user input interface unit 250, a sensor unit 260, a controller 270, a driving unit 275, a display unit 280, the audio output unit 285, a power supply unit 290 and/or a heating part 295.

The broadcast reception unit 205 may include a tuner unit 210 and a demodulation unit 220.

The tuner unit 210 may select a broadcast signal that corresponds to a channel selected by a user or all of previously stored channels among broadcast signals received through an antenna (not illustrated) or a cable (not illustrated). The tuner unit 210 may convert the selected broadcast signal into an intermediate frequency signal or a baseband image or a voice signal.

For example, the tuner unit 210 may convert the selected broadcast signal into a digital IF signal (DIF) when the selected broadcast signal is a digital broadcast signal, and may convert the selected broadcast signal into an analog baseband image or a voice signal (CVBS/SIF) when the selected broadcast signal is an analog broadcast signal. That is, the tuner unit 210 may process the digital broadcast signal or the analog broadcast signal. The analog baseband image or the voice signal (CVBS/SIF) output by the tuner unit 210 may be directly input to the controller 270.

Meanwhile, the tuner unit 210 may sequentially select broadcast signals corresponding to all broadcast channels that are stored through a channel memory function among received broadcast signals, and may convert the selected broadcast signals into intermediate frequency signals or baseband images or voice signals.

Meanwhile, the tuner unit 210 may include a plurality of tuners in order to receive broadcast signals of a plurality of channels. Alternatively, a single tuner that simultaneously receives broadcast signals of a plurality of channels is possible.

The demodulation unit 220 may receive a digital IF signal (DIF) converted by the tuner unit 210, and may perform a demodulation operation.

After performing demodulation and channel decoding, the demodulation unit 220 may output a stream signal TS. In this case, the stream signal may be a signal in which an image signal, a voice signal, or a data signal is multiplexed.

The stream signal output by the demodulation unit 220 may be input to the controller 270. After performing demultiplexing, image/voice signal processing, etc., the controller 270 may output an image through the display unit 280, and may output a voice through the audio output unit 285.

The external device interface unit 230 may transmit or receive data to and from an external device connected thereto. To this end, the external device interface unit 230 may include an A/V input and output unit (not illustrated).

The external device interface unit 230 may be connected to an external device, such as a digital versatile disk (DVD), Bluray, a game machine, a camera, a camcorder, a computer (notebook), or a set-top box, in a wired/wireless way, and may perform an input/output operation along with the external device.

The A/V input and output unit may receive an image and a voice signal from the external device.

Furthermore, the external device interface unit 230 may establish a communication network with various remote controllers 300, and may receive, from the remote controller 300, a control signal related to an operation of the image display apparatus 100 or may transmit, to the remote controller 300, data related to an operation of the image display apparatus 100.

The external device interface unit 230 may include a communication module (not illustrated) for short distance wireless communication with another electronic device.

Through such a wireless communication unit (not illustrated), the external device interface unit 230 may transmit and receive data to and from an adjacent electronic device. In particular, in a mirroring mode, the external device interface unit 230 may receive device information, information on an executed application, an application image, etc. from a mobile terminal.

The network interface unit 235 may provide an interface for connecting the image display apparatus 100 to wired/wireless network including the Internet. For example, the network interface unit 235 may receive, over a network, content or data provided by the Internet or a content provider or network operator.

Meanwhile, the network interface unit 235 may include a communication module (not illustrated) for a connection with a wired/wireless network.

For example, the external device interface unit 230 and/or the network interface unit 235 may include a communication module for short distance communication, such as wireless fidelity (Wi-Fi), Bluetooth, Bluetooth low energy (BLE), Zigbee, or near field communication (NFC), a communication module for cellular communication, such as long-term evolution (LTE), LTE-advance (LTE-A), code division multiple access (CDMA), wideband CDMA (WCDMA), a universal mobile telecommunications system (UMTS), or wireless broadband (WiBro), etc.

The storage unit 240 may store a program for the processing and control of each signal within the controller 270, and may store a signal-processed image, a voice, or a data signal.

For example, the storage unit 240 may store application programs designed for the purpose of performing various tasks that may be processed by the controller 270, and may selectively provide some of the stored application programs upon request by the controller 270.

A program, etc. stored in the storage unit 240 is not specially limited to anything which may be executed by the controller 270.

The storage unit 240 may perform a function for temporarily storing an image, a voice, or a data signal that is received from the external device through the external device interface unit 230.

The storage unit 240 may store information about designated broadcast channels through a channel memory function, such as a channel map.

The storage unit 240 may store various data that is received through the external device interface unit 230, the network interface unit 235 and/or the user input interface unit 250.

FIG. 12 illustrates an embodiment in which the storage unit 240 is provided separately from the controller 270, but the scope of the present disclosure is not limited thereto. The storage unit 240 may be included in the controller 270.

The user input interface unit 250 may transfer, to the controller 270, a signal input by a user, or may transfer a signal from the controller 270 to a user.

For example, the user input interface unit 250 may transmit/receive user input signals, such as power on/off, channel selection, and screen setting, from the remote controller 300 or may transfer, to the controller 270, user input signals received from a power key, a channel key, a volume key, a local key (not illustrated) such as a set value, etc. which are provided in the image display apparatus 100.

The sensor unit 260 may include at least one sensor. The sensor unit 260 may include a proximity sensor, a temperature/humidity sensor, an illuminance sensor, etc., for example.

The sensor unit 260 may measure a physical quantity or detect an operating state of the image display device 100, may convert the measured or detected information into an electrical signal, and may transfer the converted electrical signal to the controller 270.

The sensor unit 260 may further include at least one panel temperature sensor (not illustrated) that detects a temperature of the display panel 10. The panel temperature sensor may be attached to the display panel 10, and may be added in the form of a circuit that detects a temperature between the display panel 10 and a panel driving unit 230 (refer to FIG. 13).

The controller 270 may include at least one processor, and may control an overall operation of the image display apparatus 100 by using a processor included in the at least one processor. In this case, the processor may be a common processor, such as a central processing unit (CPU). Of course, the processor may be a dedicated device, such as an ASIC, or another hardware-based processor.

The controller 270 may demultiplex a stream that is input through the tuner unit 210, the demodulation unit 220, the external device interface unit 230, or the network interface unit 235 or may generate and output a signal for an image or voice output by processing demultiplexed signals.

The driving unit 275 may include the roller 143 on which the display unit 280 is wounded and at least one motor (not illustrated).

The display panel 10 may be wound on or unwound from the roller 143 depending on an operation of the motor.

The display unit 280 (e.g., the display 20 in FIG. 3) may generate a driving signal by converting an image signal, a data signal, an OSD signal, or a control signal that is processed by the controller 270 or an image signal, a data signal, a control signal, etc. that are received from the external device interface unit 230. This is described with reference to FIG. 13.

Figure 13:
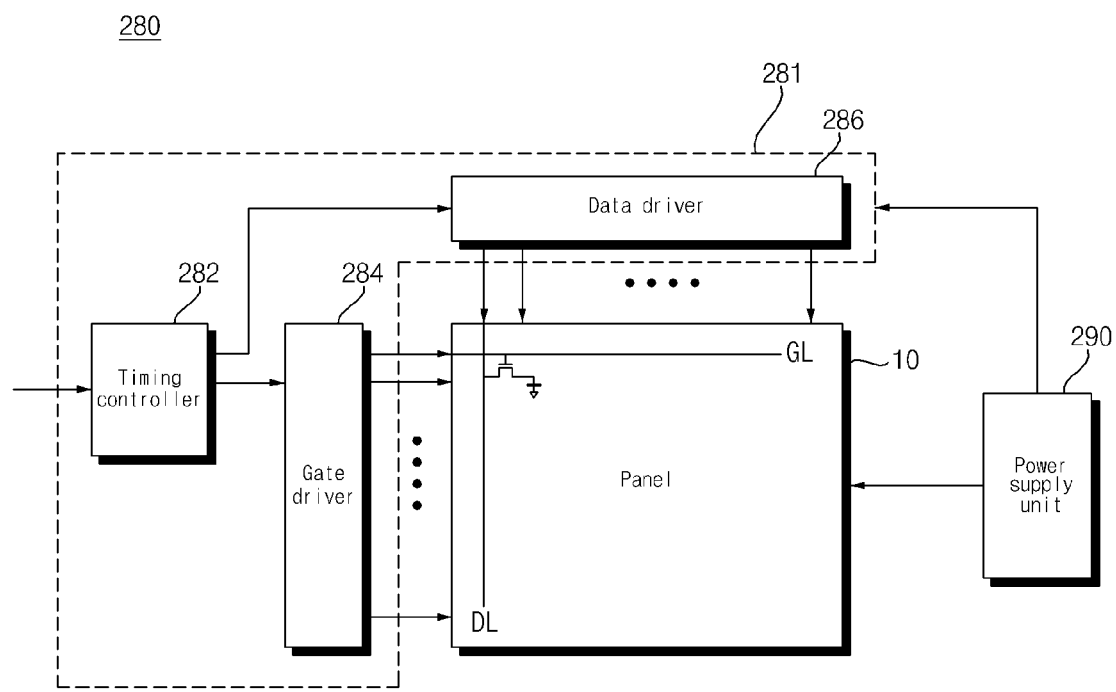
FIGS. 13 to 15c are diagrams illustrating examples of elements included in the image display apparatus according to various embodiments of the present disclosure.

Referring to FIG. 13, the display unit 280 may include the display panel 10 and a panel driving unit 281.

The display panel 10 may include a plurality of pixels. The plurality of pixels may be connected to a plurality of gate lines GL and data lines DL that are intersected and disposed in a matrix form. A plurality of thin film transistors (TFT) may be disposed at the intersections of the plurality of gate lines GL and data lines DL.

The plurality of pixels included in the display panel 10 may include RGB subpixels. Alternatively, the plurality of pixels included in the display panel 10 may include RGBW subpixels. The display unit 280 may generate a driving signal for the plurality of pixels by converting an image signal, the data signal, OSD signal, a control signal, etc. that are processed by the controller 270.

The panel driving unit 281 may drive the display panel 10 based on a control signal and a data signal transferred by the controller 270. The panel driving unit 281 may include a timing controller 282, a gate driver 284 and/or a data driver 286.

The timing controller 282 may receive a control signal, an image signal, etc. from the controller 170. The timing controller 282 may control the gate driver 284 and/or the data driver 286 in response to a control signal. The timing controller 282 may rearrange image signals based on specifications of the data driver 286, and may transmit the image signals to the data driver 286.

The gate driver 284 and the data driver 286 may supply a scanning signal and an image signal to the display panel 10 through the gate line GL and the data line DL under the control of the timing controller 282.

Meanwhile, the data driver 286 may include a plurality of source driver integrated circuits (ICs) (not illustrated) corresponding to the plurality of data lines DL.

The display unit 280 may be a flexible display including an organic light-emitting panel composed of OLEDs. The display panel 10 may be formed on a substrate made of a material having flexibility, such as polyimide.

If the display panel 10 is an organic light-emitting display panel including OLEDs, the plurality of pixels may be composed of the OLEDs.

Furthermore, the display unit 280 may be capable of a three-dimensional (3-D) display. The display unit 280 capable of the 3-D display may be divided into a glassless method and a glass method.

Meanwhile, the display unit 280 may be composed of a touch screen and may be used as an input device other than an output device.

The power supply unit 290 may supply corresponding power to the overall image processing apparatus 100. In particular, the power supply unit 290 may supply power to the controller 270 which may be implemented in the form of a system on chip (SOC), the display unit 280 for displaying an image, the audio output unit 285 for an audio output, etc.

Specifically, the power supply unit 290 may include a converter (not illustrated) for converting AC power into DC power and a Dc/Dc converter (not illustrated) for converting a level of DC power.

The power supply unit 290 may supply a common electrode voltage Vcom to the display panel 10, and may supply a gamma voltage to the data driver 286.

An image signal image-processed by the controller 270 may be input to the display unit 280, and may be displayed as an image corresponding to the corresponding image signal. Furthermore, an image signal image-processed by the controller 270 may be input to an external output device through the external device interface unit 230.

Although not illustrated in FIG. 12, the controller 270 may include a demultiplexing unit (not illustrated), an image processing unit (not illustrated), etc.

The audio output unit 285 may include an audio device, such as a speaker or a buzzer, may receive a signal voice-processed by the controller 270, and may output the signal as a voice.

A voice signal processed by the controller 270 may be output to the audio output unit 285 as a sound. Furthermore, a voice signal processed by the controller 270 may be input to an external output device through the external device interface unit 230.

In addition, the controller 270 may control an overall operation within the image processing apparatus 100.

For example, the controller 270 may control the tuner unit 210 to tune a channel selected by a user or broadcast corresponding to a previously stored channel.

Furthermore, the controller 270 may control the image processing apparatus 100 based on a user command input through the user input interface unit 250 or an internal program.

Meanwhile, the controller 270 may control the display unit 280 to display an image. In this case, the image displayed on the display unit 280 may be a still image or a moving image, and may be a 2-D image or a 3-D image.

Meanwhile, the controller 270 may display a designated 2-D object within an image that is displayed on the display unit 280. For example, the object may be at least one of an accessed web screen (paper, magazine, etc.), an electronic program guide (EPG), various menus, widgets, icons, still images, moving images, and text.

A heating part 295 may include a hot wire (not illustrated) disposed within the housing 30. In this case, the hot wire of the heating part 295 may include a heating element that generates heat by power supplied thereto and an insulating element that surrounds the heating element.

For example, the power supply unit 290 may supply power to the hot wire of the heating part 295 under the control of the controller 270. The hot wire of the heating part 295 may be heated by the supplied power. The heating part 295 is described with reference to FIGS. 14 to 15c.

Figure 14:
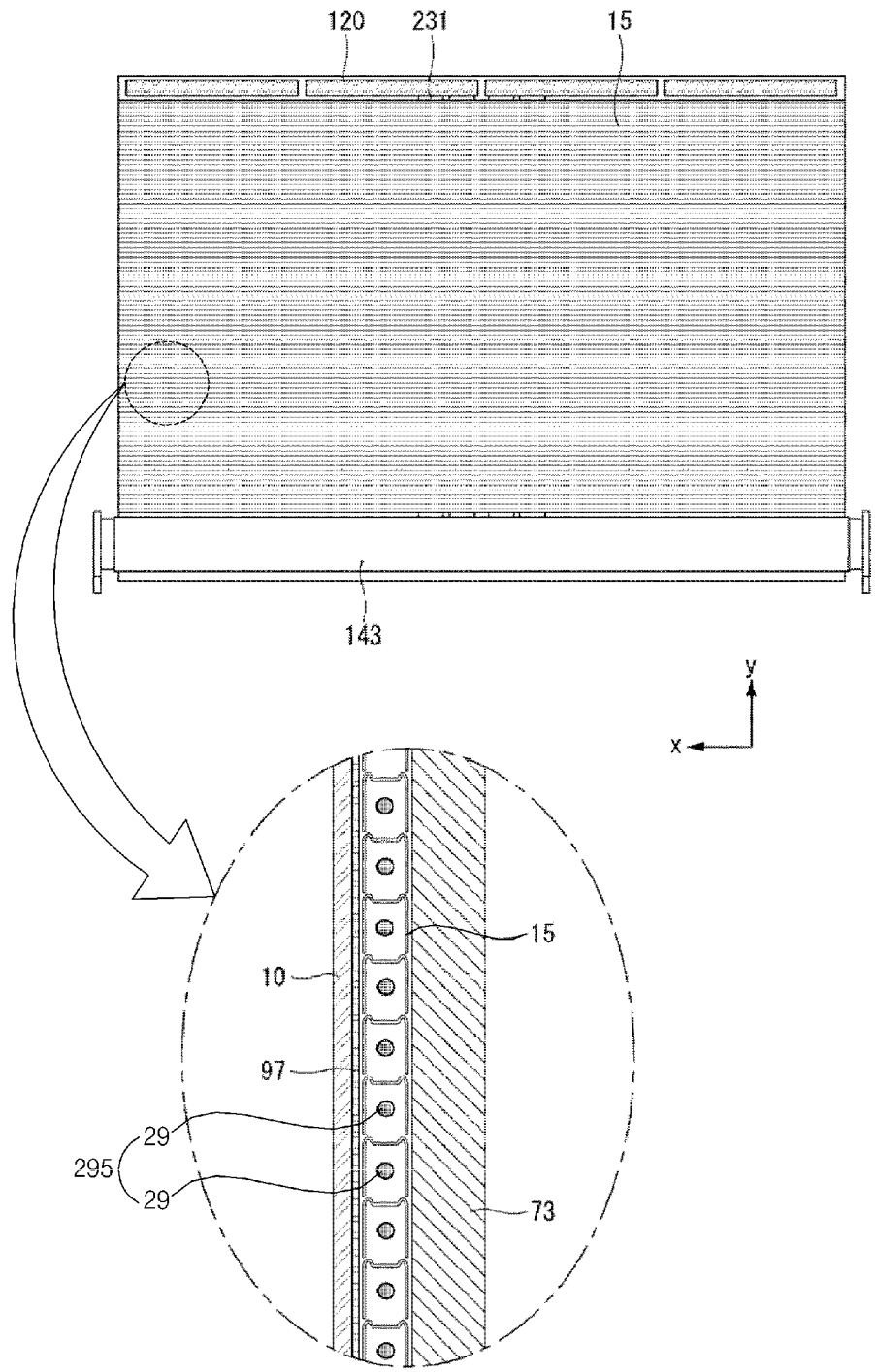

Referring to FIG. 14, the hot wire of the heating part 295 may be disposed within the module cover 15.

The hot wire of the heating part 295 may include a plurality of sub-hot wires 29 disposed within a plurality of segments of the module cover 15, respectively.

Each of the plurality of sub-hot wires 29 may elongate in an x axis direction within each of the plurality of segments of the module cover 15. One end and/or the other end of at least one of the plurality of sub-hot wires 29 may be connected to another sub-hot wire 29.

Figure 15A:
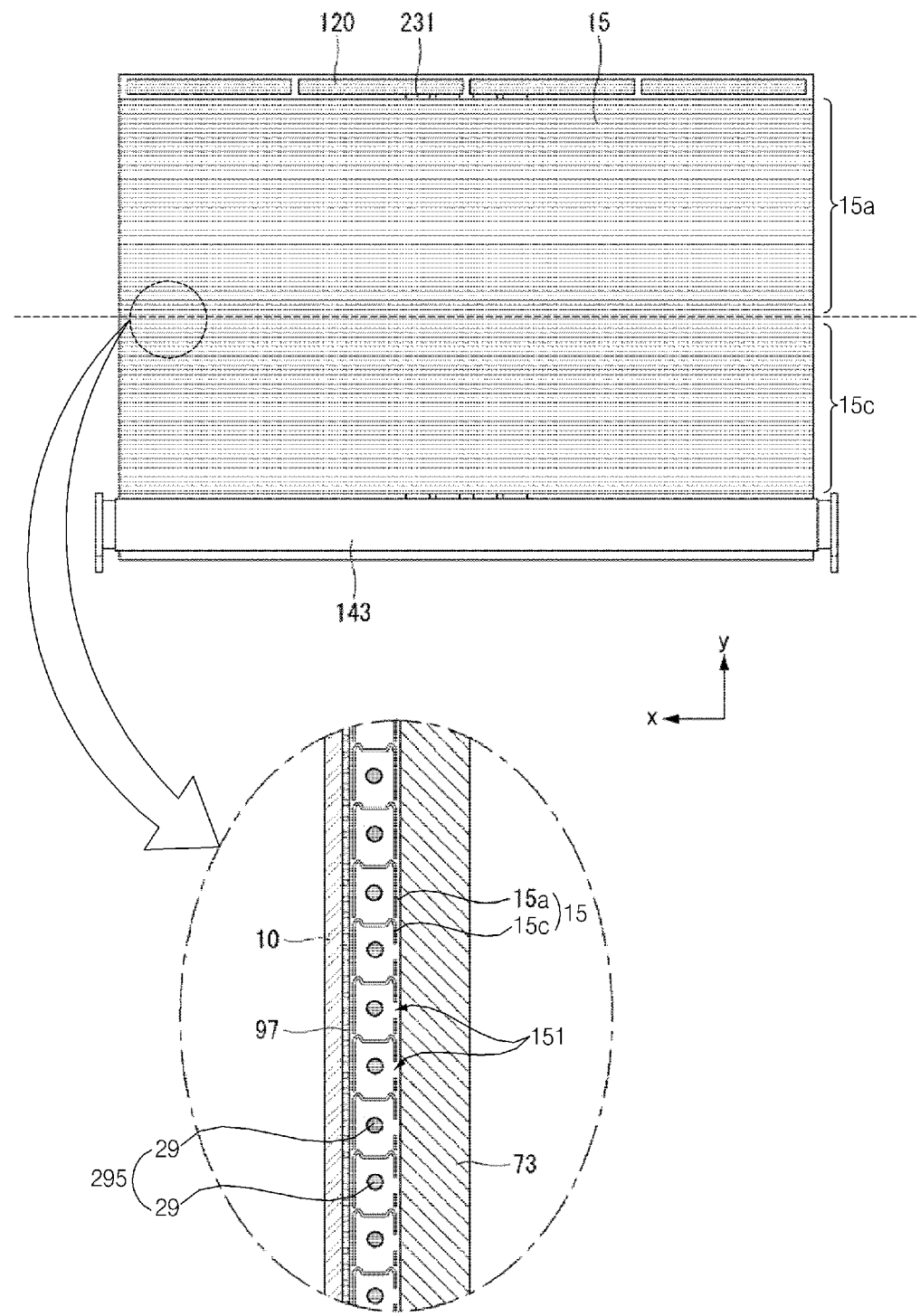
Figure 15B:
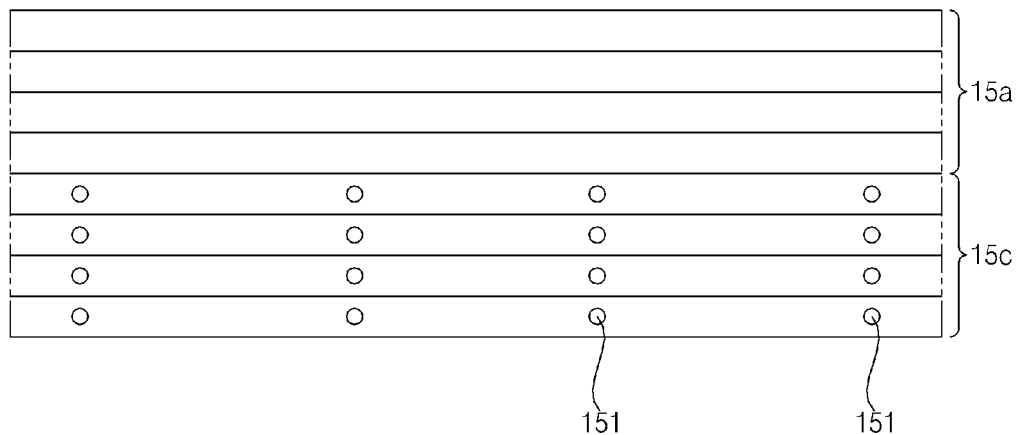
Figure 15C:
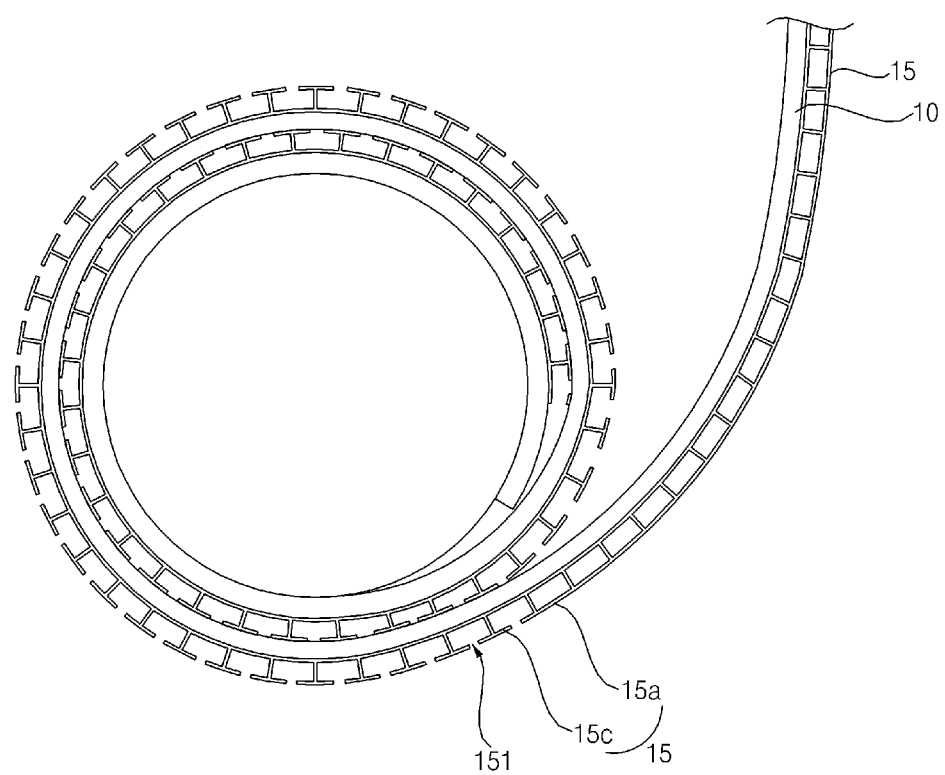

Referring to FIGS. 15a to 15c, the module cover 15 may include a plurality of first segments 15a included in a first segment group and a plurality of second segments 15c included in a second segment group.

The plurality of first segments 15a may be segments that are earlier exposed to the outside of the housing 30 than the plurality of second segments 15c when the display panel 10 is rolled up. That is, the plurality of second segments 15c may be segments that are earlier moved to the inside of the housing 30 than the plurality of first segments 15a and wounded on the panel roller 143 when the display panel 10 is rolled down.

Meanwhile, when the display panel 10 is rolled down the inside of the housing 30 and thus the display panel 10 and the module cover 15 are wounded on the panel roller 143, at least a part of the display panel 10 may be surrounded by the module cover 15.

In this case, if the plurality of sub-hot wires 29 is heated, a temperature of one area of the display panel 10 surrounded by the module cover 15 may more rapidly rise than a temperature of the other area of the display panel 10. Accordingly, although the temperature of the one area of the display panel 10 reaches a designated temperature, the temperature of the other area of the display panel 10 may not reach the designated temperature. Furthermore, when the temperature of the other area of the display panel 10 reaches the designated temperature, elements of the one area of the display panel 10 may be damaged because the temperature of one area of the display panel 10 is higher than the designated temperature.

By taking such a point into consideration, at least some of the plurality of segments of the module cover 15 may include at least one third hole 151 that penetrates a side opposite to a side that faces the display panel 10 and that is formed therein.

As in FIG. 15c, if the plurality of second segments 15c includes the at least one third hole 151, although the plurality of sub-hot wires 29 is heated, a temperature of one area of the display panel 10 that is surrounded by the plurality of second segments 15c can regularly rise along with a temperature of the other area of the display panel 10 because heat is discharged through the third hole 151. Accordingly, the one area of the display panel 10 surrounded by the plurality of second segments 15c can be prevented from being overheated.

Meanwhile, the image processing apparatus 100 may further include a photographing unit (not illustrated). The photographing unit may photograph a user. The photographing unit may be implemented as one camera, but the present disclosure is not limited thereto and may be implemented as a plurality of cameras. Meanwhile, the photographing unit may be buried in the image processing apparatus 100 over the display unit 280 or may be separately disposed. Image information photographed by the photographing unit may be input to the controller 270.

The controller 270 may determine a location of a user based on an image photographed by the photographing unit. For example, the controller 270 may confirm a distance (z axis coordinates) between the user and the image processing apparatus 100. In addition, the controller 270 may confirm x axis coordinates and y axis coordinates within the display unit 280, which correspond to the location of the user.

The controller 270 may detect a gesture of a user based on an image photographed by the photographing unit, a sensed signal from the sensor unit, or a combination thereof.

Meanwhile, the image display apparatus 100 may further include an input unit (not illustrated). The input unit may be provided on one side of the body of the image display apparatus 100. For example, the input unit may include a touch pad, a physical button, etc.

The input unit may receive various user commands related to an operation of the image display apparatus 100, and may transfer, to the controller 270, a control signal corresponding to an input command.

Meanwhile, the image display apparatus 100 may be a fixed or mobile digital broadcast receiver capable of receiving digital broadcast.

Meanwhile, the block diagram of the image display apparatus 100 illustrated in FIG. 12 is merely a block diagram for an embodiment of the present disclosure. The elements of the block diagram may be integrated, added, or omitted depending on specifications of the image display apparatus 100, which are actually implemented.

That is, if necessary, two or more elements may be combined into one element or one element may be divided into two or more elements. Furthermore, a function performed by each block is for describing an embodiment of the present disclosure, and a detailed operation or apparatus thereof does not limit the scope of right of the present disclosure.

The remote controller 300 may include various communication modules, such as Wi-Fi, Bluetooth, BLE, Zigbee, and NFC.

The remote controller 300 may transmit a user command to the user input interface unit 250 through the communication module.

Furthermore, the remote controller 300 may receive an image, a voice, a data signal, etc. output by the user input interface unit 250 through the communication module. The remote controller 300 may display the image, the voice, the data signal, etc. or output the image, the voice, the data signal, etc. as a voice.

Figure 16:
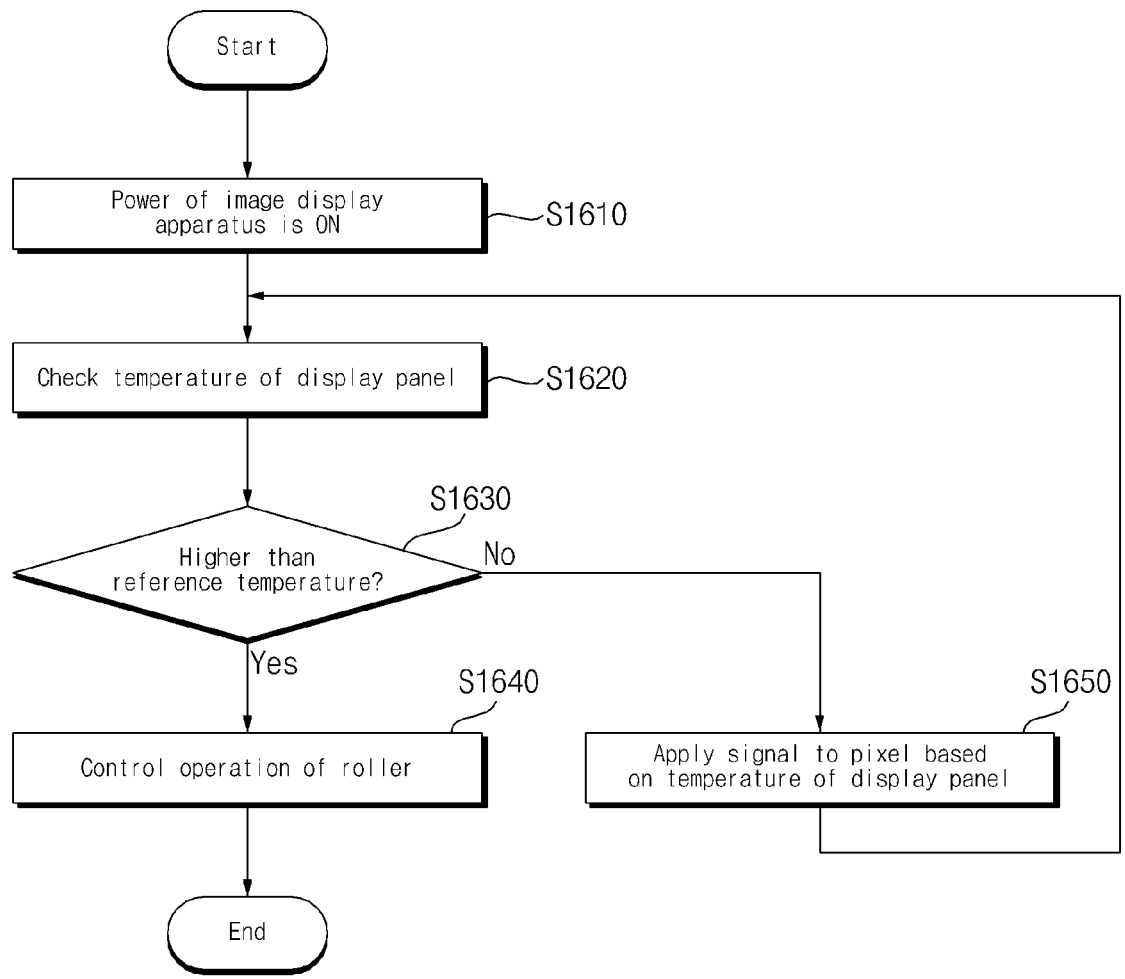
FIGS. 16 and 17 are examples of flowcharts of operating methods of the image display apparatus according to an embodiment of the present disclosure.
Figure 17:
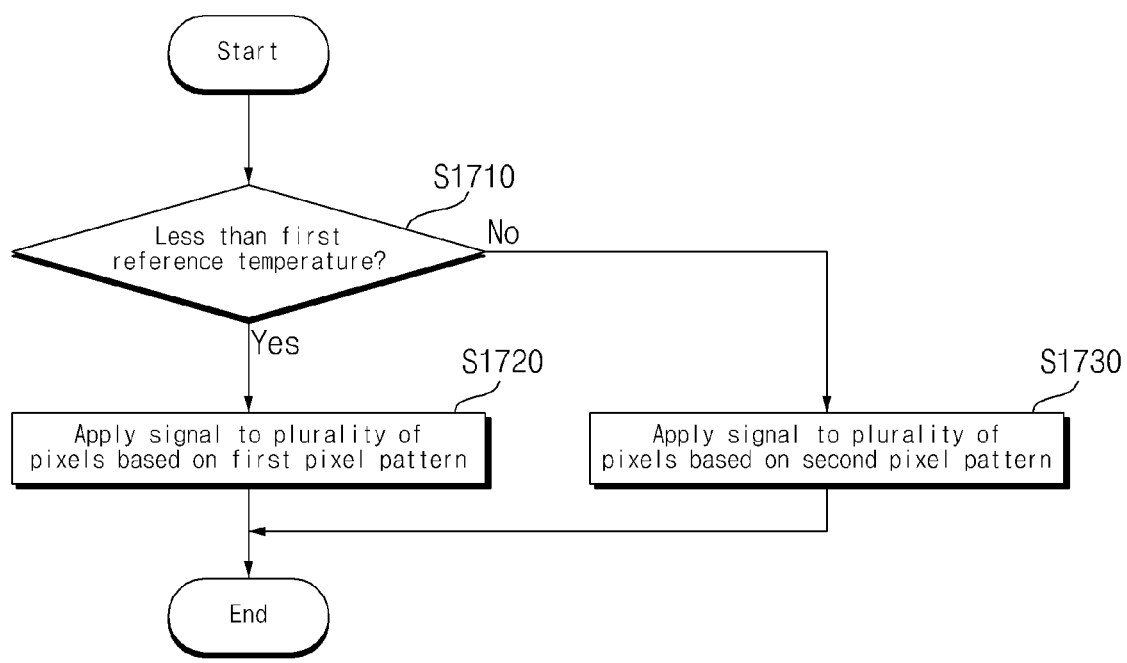

FIGS. 16 and 17 are examples of flowcharts of operating methods of the image display apparatus according to an embodiment of the present disclosure. FIGS. 18a to 23b are diagrams for which reference is made to a description of operating methods of the image display apparatus according to various embodiments of the present disclosure.

Referring to FIG. 16, in operation S1610, the image display apparatus 100 may turn on power of the image display apparatus 100. For example, the image display apparatus 100 may turn on the power of the image display apparatus 100 in response to a user input signal that turns on the power through the user input interface unit 250. In this case, at a timing at which the power of the image display apparatus 100 is turned on, the display panel 10 may be wound on the panel roller 143 and may not be exposed to the outside of the housing 30.

In operation S1620, the image display apparatus 100 may check a temperature of the display panel 10. For example, the image display apparatus 100 may check the temperature of the display panel 10 based on a sensing value detected through the panel temperature sensor.

In operation S1630, the image display apparatus 100 may determine whether the temperature of the display panel 10 is a preset reference temperature or higher. In this case, the reference temperature may mean a temperature at which a material, such as polyimide included in the display panel 10, is not hardened and elements included in the display panel 10 can maintain an operating state equal to or higher than a reference. For example, the reference temperature may correspond to a room temperature (e.g., 25° C.).

When the temperature of the display panel 10 is the reference temperature or more, in operation S1640, the image display apparatus 100 may control an operation of the panel roller 143. For example, when the temperature of the display panel 10 is 25° C. or higher, the image display apparatus 100 may control an operation of the panel roller 143 so that the display panel 10 is rolled up.

Meanwhile, the temperature of the display panel 10 is less than the reference temperature, in operation S1650, the image display apparatus 100 may apply a signal to at least some of the plurality of pixels included in the display panel 10 based on the temperature of the display panel 10.

For example, when the temperature of the display panel 10 is less than 25° C., the image display apparatus 100 may control pixels to which a signal is applied to output light by applying the signal to at least some of the plurality of pixels included in the display panel 10. In this case, as heating occurs due to pixels from which light is output, the temperature of the display panel 10 may rise.

Meanwhile, when the temperature of the display panel 10 is less than the reference temperature, the image display apparatus 100 may additionally control the hot wire of the heating part 295 to be heated.

For example, when the temperature of the display panel 10 is less than 25° C., the image display apparatus 100 may supply power to the hot wire of the heating part 295 so that the sub-hot wire 29 disposed within each of the plurality of segments of the module cover 15 is heated.

The image display apparatus 100 may branch to operation S1620, may check a temperature of the display panel 10, and may continuously apply a signal to at least some of the plurality of pixels included in the display panel 10 based on the temperature of the display panel 10 until the temperature of the display panel 10 reaches the reference temperature.

Meanwhile, applying the signal to at least some of the plurality of pixels included in the display panel 10 based on the temperature of the display panel 10 is more specifically described with reference to FIG. 17.

Referring to FIG. 17, in operation S1710, the image display apparatus 100 may determine whether the temperature of the display panel 10 is less than a first reference temperature. In this case, the first reference temperature may be a temperature lower than the reference temperature, that is, a criterion for the determination in operation S1630 of FIG. 16. For example, the first reference temperature may correspond to a low temperature (e.g., 10° C.) lower than a room temperature (e.g., 25° C.).

When the temperature of the display panel 10 is less than the first reference temperature (e.g., 10° C.), in operation S1720, the image display apparatus 100 may apply a signal to at least some of the plurality of pixels included in the display panel 10 based on a first pixel pattern.

Meanwhile, when the temperature of the display panel 10 is the first reference temperature (e.g., 10° C.) or higher and is less than a second reference temperature (e.g., 25° C.), in operation S1730, the image display apparatus 100 may apply a signal to at least some of the plurality of pixels included in the display panel 10 based on a second pixel pattern. In this case, the second reference temperature may correspond to a room temperature (e.g., 25° C.) that corresponds to the reference temperature, that is, a criterion for the determination in operation S1630 of FIG. 16.

In this case, when the signal is applied to the display panel 10 based on the first pixel pattern, the temperature of the display panel 10 may more rapidly rise compared to a case where the signal is applied to the display panel 10 based on the second pixel pattern.

Figure 18A:
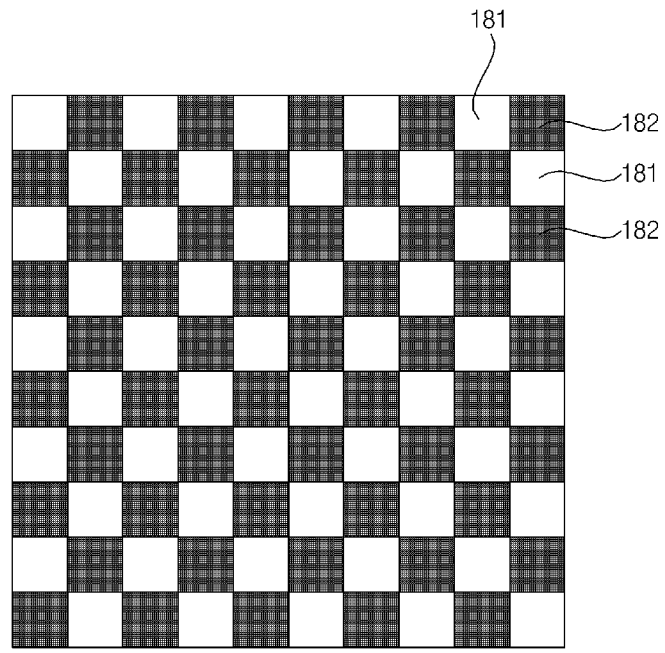
FIGS. 18a to 23b are diagrams for which reference is made to a description of operating methods of the image display apparatus according to various embodiments of the present disclosure.
Figure 18B:
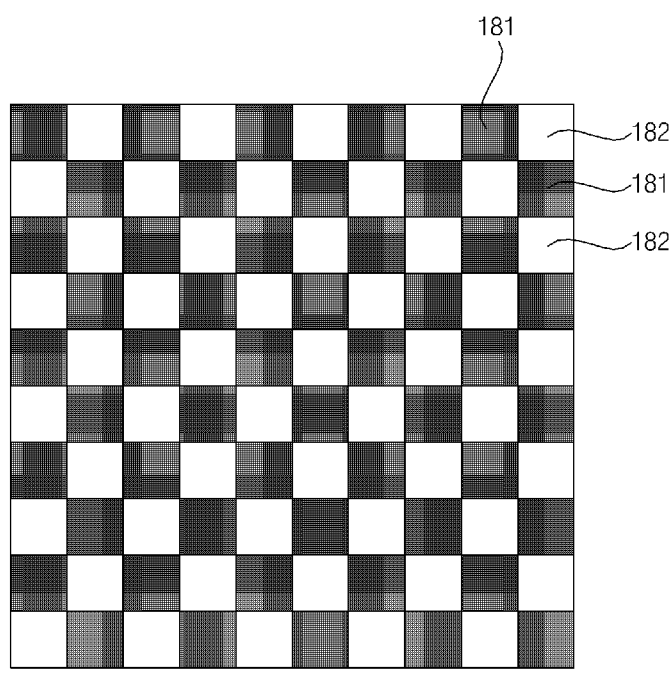

Referring to FIGS. 18a and 18b, if a signal is applied to the display panel 10 based on the first pixel pattern, the signal may be first applied to a first pixel group 181 that corresponds to half of the plurality of pixels included in the display panel 10 for a preset given time. In this case, the designated time for which the signal is applied may be a time (e.g., two minutes) for which the deterioration of elements constituting the display panel 10 is not caused.

Furthermore, if the signal is applied to the first pixel group 181 for the preset given time, the signal may be applied to a second pixel group 182 that corresponds to the remaining half of the plurality of pixels for a preset given time.

In this case, the pixels included in the first pixel group 181 and the pixels included in the second pixel group 182 may be constructed to not overlap.

Figure 19A:
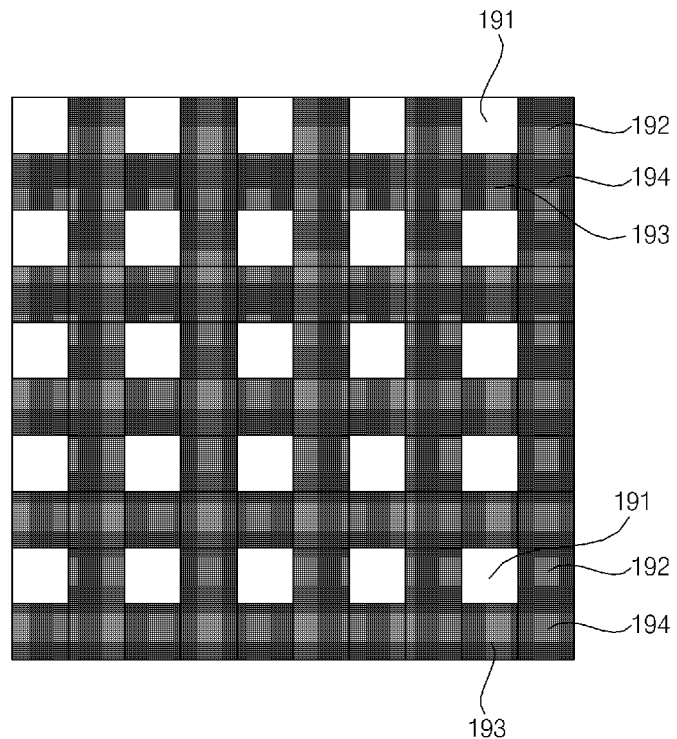
Figure 19B:
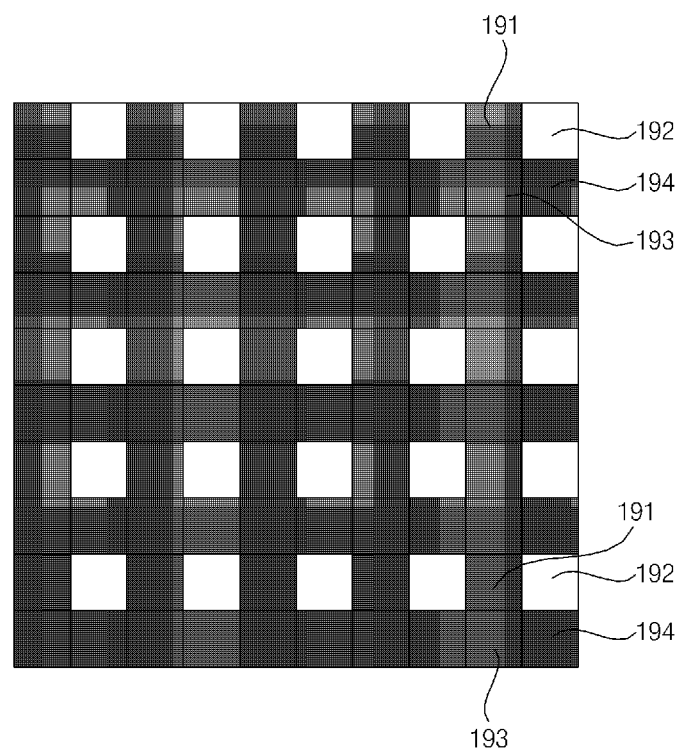
Figure 19C:
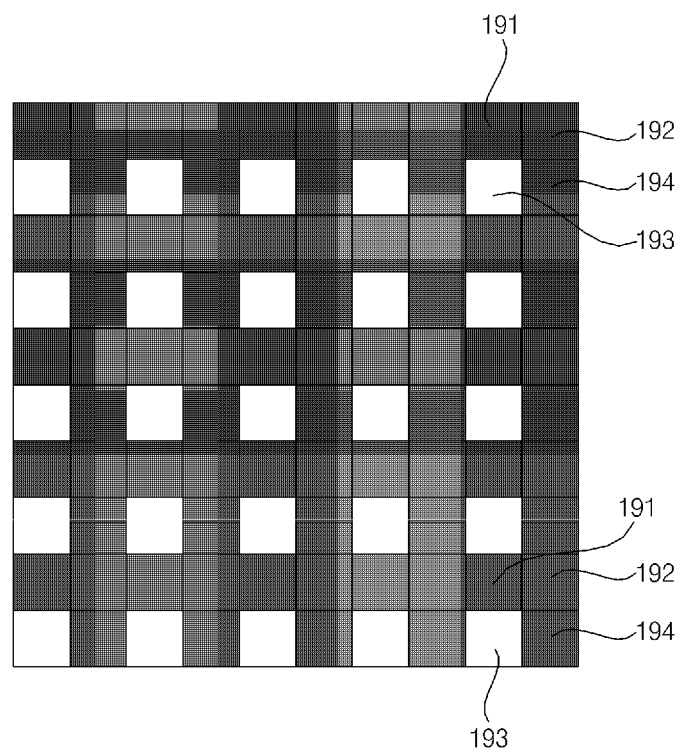

Meanwhile, referring to FIGS. 19a to 19c, when a signal is applied to the display panel 10 based on the second pixel pattern, a signal may be first applied to a third pixel group 191 that corresponds to 25% of the plurality of pixels included in the display panel 10 for a preset given time.

Furthermore, if the signal is applied to the third pixel group 191 for the preset given time, the signal may be sequentially applied to a fourth pixel group 192, a fifth pixel group 193, and a sixth pixel group 193 that correspond to another 25% of the plurality of pixels for the preset given time.

In this case, the pixels included in the third pixel group 191 to the sixth pixel group 194 may be constructed to not overlap.

That is, a temperature of the display panel 10 can more rapidly rise because the signal is applied to more pixels for the given time, compared to the case where the signal is applied to the display panel 10 based on the first pixel pattern and the case where the signal is applied to the display panel 10 based on the second pixel pattern.

Figure 20A:
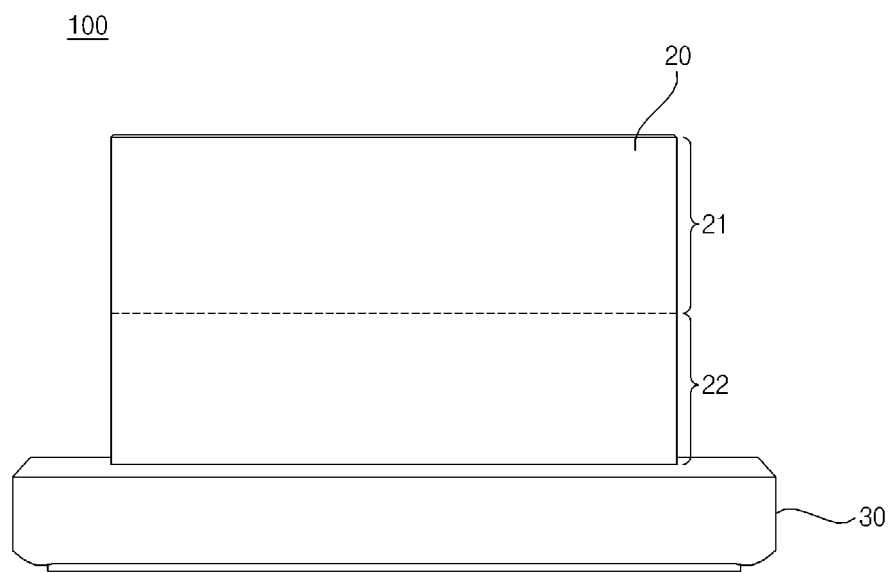
Figure 20B:
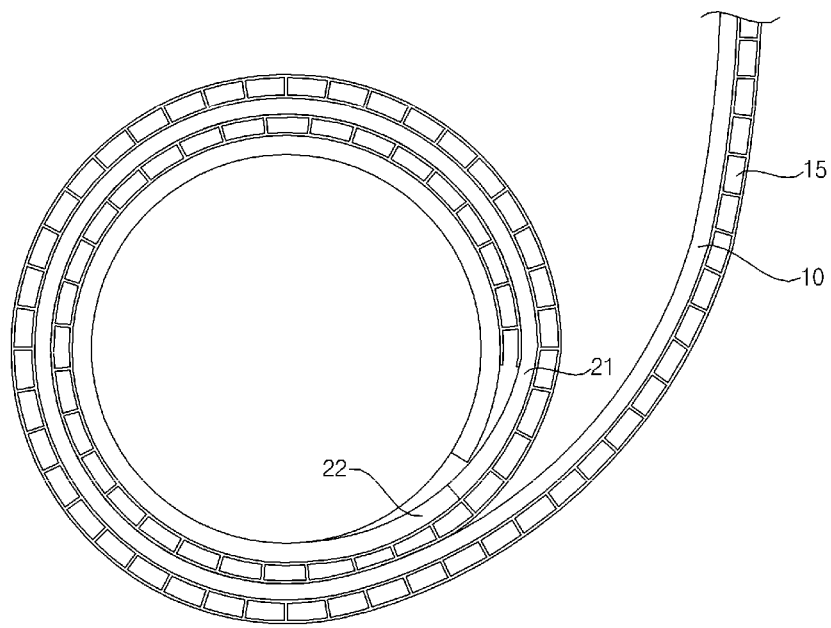

Meanwhile, referring to FIGS. 20a and 20b, if the display panel 10 is rolled down within the housing 30 and thus the display panel 10 and the module cover 15 are wound and stacked on the panel roller 143 plural times, a second area 22 that belongs to the display panel 10 and that is first wounded on the panel roller 143 may be surrounded by a first area 21.

In this case, when the same signal is applied to a plurality of pixels included in the first area 21 of the display panel 10 and a plurality of pixels included in the second area 22, a temperature of the second area 22 may more rapidly rise than a temperature of the first area 21 due to heat occurring from the first area 21. In such a case, before the temperature of the first area 21 reaches a designated temperature, the temperature of the second area 22 may already reach the designated temperature. When the first area 21 reaches the designated temperature, the temperature of the second area 22 already becomes higher than the designated temperature, and elements in the second area 22 of the display panel 10 may be overheated.

By taking such a point into consideration, the image display apparatus 100 may apply signals to the plurality of pixels included in the first area 21 of the display panel 10 and the plurality of pixels included in the second area 22 based on different patterns.

Figure 21A:
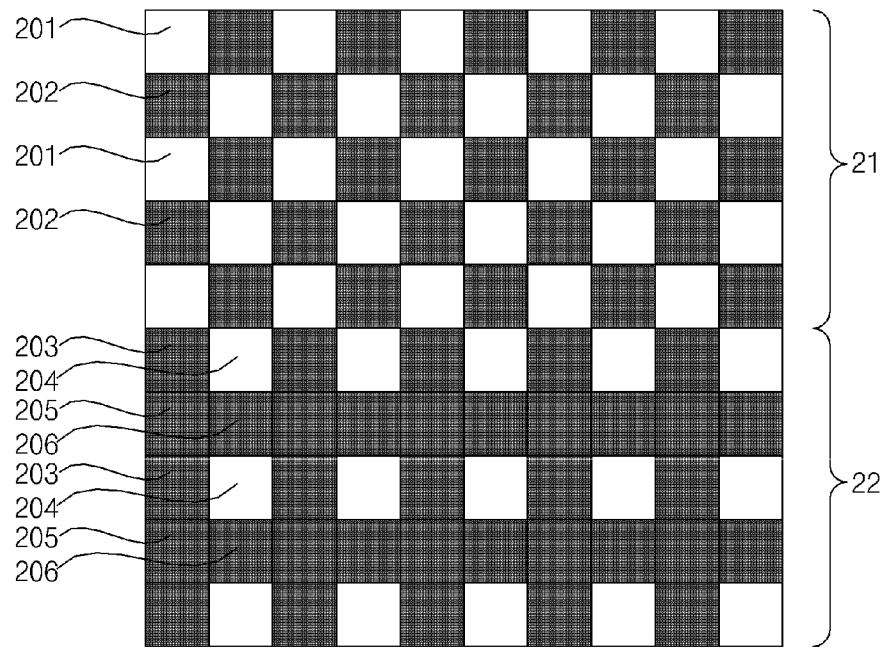
Figure 21B:
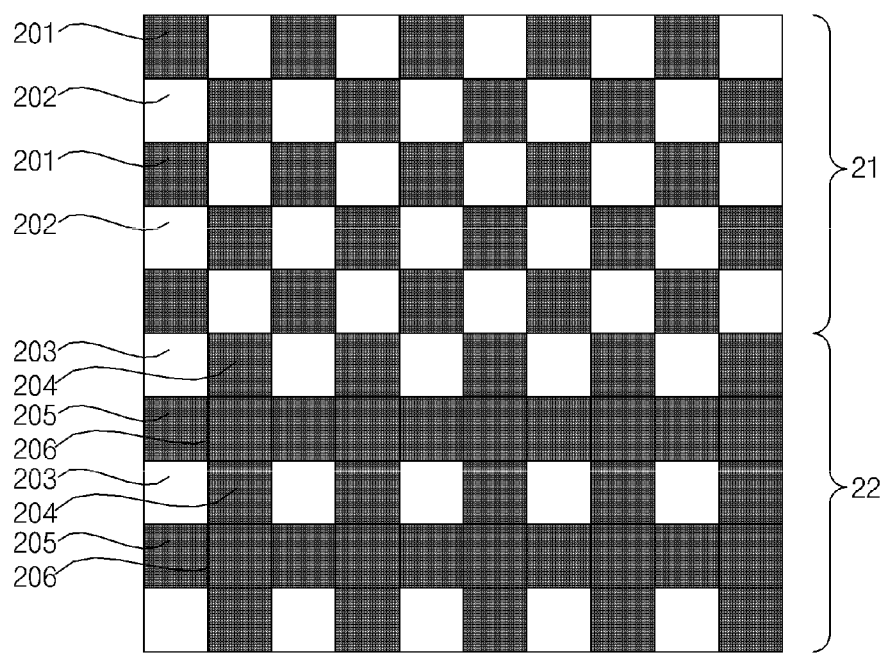

Referring to FIGS. 21a and 21b, if a signal is applied to the display panel 10 to the first pixel pattern, the signal may be first applied to a first pixel group 201 that corresponds to half of the pixels of the first area 21 of the display panel 10 and a fourth pixel group 204 that corresponds to 25% of the pixels of the second area 22 for a preset given time.

Furthermore, if a signal is applied to the first pixel group 201 and the fourth pixel group 204 for a preset given time, the signal may be applied to a second pixel group 202 that corresponds to the remaining half of the pixels of the first area 21 of the display panel 10 and a third pixel group 203 that corresponds to another 25% of the pixels of the second area 22 of the display panel 10, for the preset given time.

In this case, the pixels included in the first pixel group 201 to the sixth pixel group 206 may be constructed to not overlap.

Figure 22A:
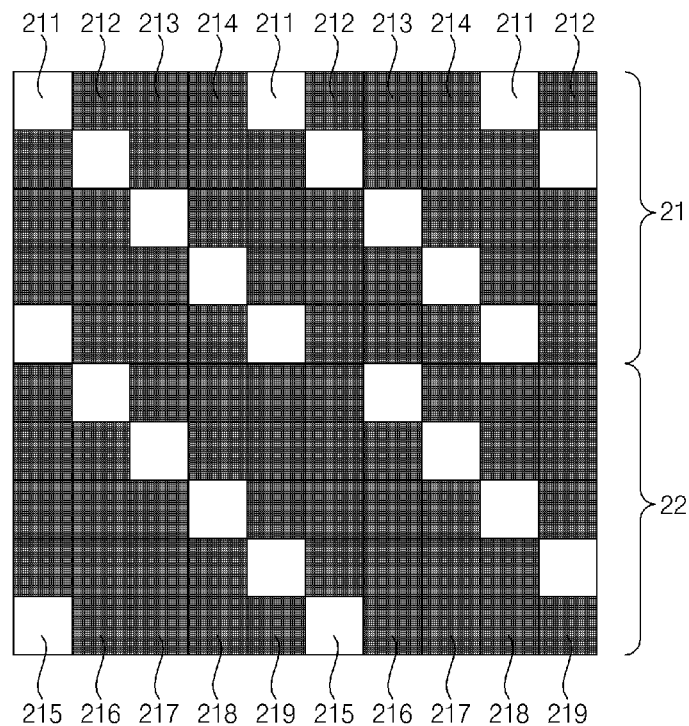
Figure 22B:
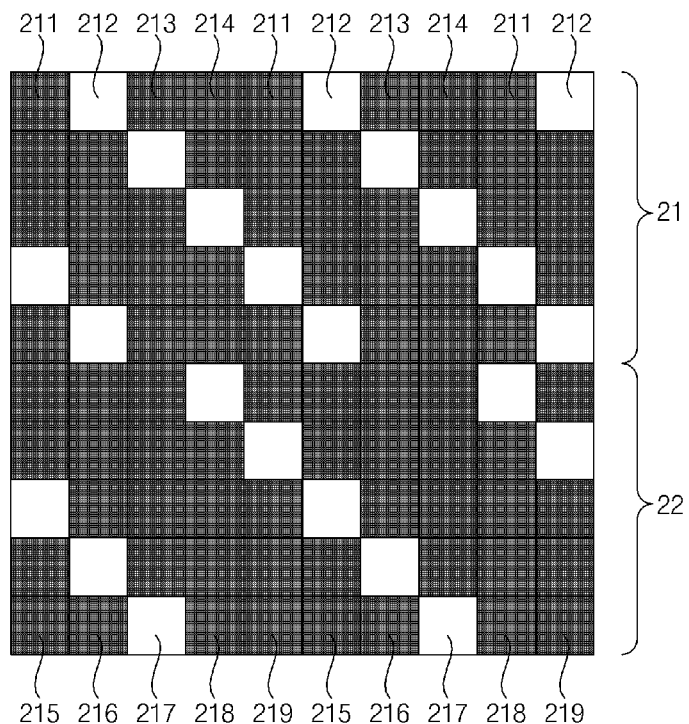

Meanwhile, referring to FIGS. 22a and 22b, if a signal is applied to the display panel 10 based on the second pixel pattern, the signal may be first applied to a first pixel group 211 that corresponds to 25% of the pixels of the first area 21 of the display panel 10 and a fifth pixel group 215 that corresponds to 20% of the pixels of the second area 22 for a preset given time.

Furthermore, if a signal is applied to the first pixel group 211 and the fifth pixel group 215 for a preset given time, the signal may be applied to a second pixel group 212 that corresponds to another 25% of the pixels of the first area 21 of the display panel 10 and a seventh pixel group 217 that corresponds to another 20% of the pixels of the second area 22 of the display panel 10 for the preset given time.

In this case, the pixels included in the first pixel group 201 to a ninth pixel group 219 may be constructed to not overlap.

That is, as illustrated in FIGS. 21a to 22b, although the signal is applied to the display panel 10, the signal is applied to more pixels for the given time, compared to a case where the signal is applied to the display panel 10 based on the first pixel pattern and a case where the signal is applied to the display panel 10 based on the second pixel pattern. Accordingly, the temperature of the display panel 10 can more rapidly rise, and the overheating of the second area 22 of the display panel 10 can also be prevented.

Meanwhile, the image display apparatus 100 may heat the hot wire of the heating part 295 based on a temperature of the display panel 10.

For example, when a temperature of the display panel 10 is less than a first reference temperature (e.g., 10° C.), the image display apparatus 100 may supply power to the hot wire of the heating part 295 so that all the sub-hot wires 29 disposed within the plurality of segments of the module cover 15 are heated.

For example, when a temperature of the display panel 10 is a first reference temperature (e.g., 10° C.) or higher and is less than a second reference temperature (e.g., 25° C.), the image display apparatus 100 may apply only a signal to at least some of the plurality of pixels included in the display panel 10 based on the second pixel pattern without heating the hot wire of the heating part 295.

Alternatively, for example, when a temperature of the display panel 10 is a first reference temperature (e.g., 10° C.) or higher and is less than a second reference temperature (e.g., 25° C.), the image display apparatus 100 may supply power to the hot wire of the heating part 295 so that only some of the sub-hot wires 29 disposed within the plurality of segments of the module cover 15 are heated.

Meanwhile, when a temperature of the display panel 10 is a preset reference temperature or higher, the image display apparatus 100 may apply a signal to at least some of the plurality of pixels included in the display panel 10 so that the temperature of the display panel 10 is maintained to the reference temperature or more until the image display apparatus 100 controls an operation of the panel roller 143.

In this case, the signal applied to raise the temperature of the display panel 10 in operation S1650, etc. may be named a main signal, and the signal applied to maintain the temperature of the display panel 10 may be named a sub-signal. In this case, a wavelength of light that is output while the main signal is applied to pixels included in the display panel 10 may be shorter than a wavelength of light that is output while the sub-signal is applied to the pixels. For example, white light may be output from the pixels to which the main signal is applied, and red light may be output from the pixels to which the sub-signal is applied.

Figure 23A:
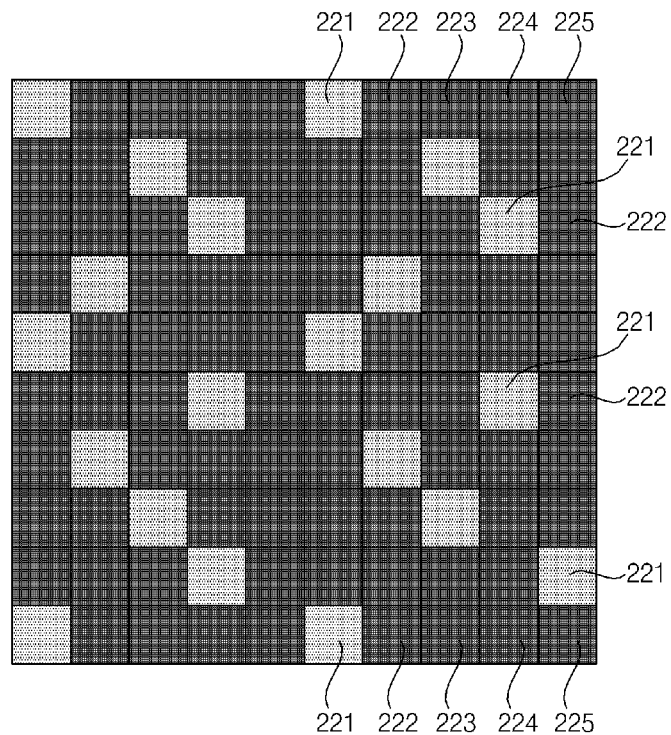
Figure 23B:
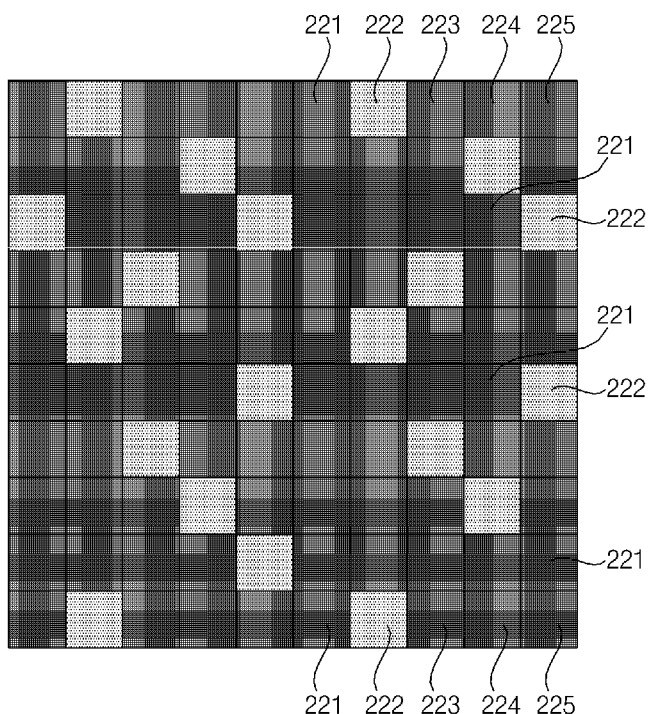

As illustrated in FIGS. 23a and 23b, when a temperature of the display panel 10 is a preset reference temperature (e.g., 25° C.) or higher, the image display apparatus 100 may first apply the sub-signal to a first pixel group 221 that corresponds to 20% of the plurality of pixels included in the display panel 10 for a preset given time until the image display apparatus 100 controls an operation of the panel roller 143.

Furthermore, if the sub-signal is applied to the first pixel group 221 for a preset given time, the sub-signal may be sequentially applied to a second pixel group 222 to a fifth pixel group 225 that correspond to another 20% of the plurality of pixels for a preset given time.

Meanwhile, if a function (hereinafter a schedule function) for previously setting a timing at which an image is output is previously set by a user through the display 20, the image display apparatus 100 can reduce the amount of power that is unnecessarily consumed in order to raise and/or maintain a temperature of the display panel 10 by checking the temperature of the display panel 10 prior to a given time from the timing at which the image is output through the display 20 and raising and/or maintaining the temperature of the display panel 10 based on the timing at which the image is output.

As described above, according to various embodiments of the present disclosure, damage to the display panel 10 which may occur because an operation of the panel roller 143 is controlled in the state in which the display panel 10 has been hardened can be prevented because the display panel 10 hardened in a low-temperature environment can be sufficiently softened before the operation of the panel roller 143 is controlled.

Furthermore, when a temperature of the display panel 10 is low, a response speed of the display panel 10 may be reduced due to a change in the operating characteristic of a thin film transistor (TFT), etc. However, according to various embodiments of the present disclosure, a user satisfaction level can be improved because the best state of the display panel 10 can be maintained despite a change in the surrounding environment.

It is to be understood that the accompanying drawings are merely intended to make easily understood the embodiments disclosed in this specification, and the technical spirit disclosed in this specification is not restricted by the accompanying drawings and includes all changes, equivalents, and substitutions which fall within the spirit and technical scope of the present disclosure.

Meanwhile, the operating method of the image display apparatus of the present disclosure may be implemented as a processor-readable code in a processor-readable recording medium included in the image display apparatus. The processor-readable recording medium includes all types of recording devices in which processor-readable data is stored. Example of the processor-readable recording medium may include a ROM, a RAM, a CD-ROM, magnetic tapes, floppy disks, and optical data storages, and also includes an implementation in the form of a carrier wave, such as transmission through the Internet. Furthermore, the processor-readable recording medium may be distributed to computer systems connected over a network, and the processor-readable code may be stored and executed in a distributed manner.

Furthermore, although some embodiments of this specification have been illustrated and described above, this specification is not limited to the aforementioned specific embodiments, and a person having ordinary knowledge in the art to which this specification pertains may modify the present disclosure in various ways without departing from the subject matter of the claims. Such modified embodiments should not be individually interpreted from the technical spirit or prospect of this specification.

The invention claimed is:

1. An image display apparatus, comprising:
a housing;
a roller disposed within the housing;
a display panel including a plurality of pixels and wound on or unwound from the roller;
a temperature sensor configured to detect a temperature of the display panel; and
a processor configured to:
check the temperature of the display panel based on a sensing value detected through the temperature sensor,
in response to the temperature of the display panel being less than a reference temperature, apply a light emitting main signal to a first pixel group including some pixels of a first area of the display panel and a second pixel group including some pixels of a second area of the display panel, and
in response to the temperature of the display panel being equal to or greater than the reference temperature, control an operation of the roller to wind or unwind the display panel from the roller,
wherein the first area is first exposed to an outside of the housing before the second area when the display panel is rolled up.

2. The image display apparatus of claim 1, wherein the processor is configured to:
in response to the temperature of the display panel being less than a first reference temperature, apply the light emitting main signal to a first pattern of pixels including the first pixel group and the second pixel group, and
in response to a preset first time elapsing from a timing at which the light emitting main signal is applied to the first pattern of pixels, apply the light emitting main signal to a second pattern of pixels including pixels other than the first group and the second group among the pixels of the display panel, and
wherein the pixels included in the first pixel pattern and the second pixel pattern do not overlap.

3. The image display apparatus of claim 2, wherein the processor is configured to:
in response to the temperature of the display panel being equal to higher than the first reference temperature and less than a second reference temperature higher than the first reference temperature, apply the light emitting main signal to a third pattern of pixels, and
in response to a preset second time elapsing, apply the light emitting main signal to a fourth pattern of pixels,
wherein the pixels included in the third and fourth pattern of pixels do not overlap, and
wherein a number of pixels included in the third and fourth pattern of pixels is smaller than a number of pixels included in the first and second pattern of pixels.

4. The image display apparatus of claim 1,
wherein a number of pixels included in the first pixel group is greater than a number of pixels included in the second pixel group.

5. The image display apparatus of claim 4, wherein the processor is configured to:
in response to a preset time elapsing from a timing at which the light emitting main signal is applied to the first and second pixel groups, apply the light emitting main signal to a third pixel group included in the first area and a fourth pixel group included in the second area,
wherein a number of pixels included in the third pixel group is greater than a number of pixels included in the fourth pixel group,
wherein the pixels included in the first pixel group and the third pixel group do not overlap, and
wherein the pixels included in the second pixel group and the fourth pixel group do not overlap.

6. The image display apparatus of claim 1, wherein the processor is configured to:
in response to the temperature of the display panel being the reference temperature or higher, apply a sub-signal to at least one of the plurality of pixels until the processor controls an operation of the roller to wind or unwind the display panel, and
wherein the display panel outputs light having a first wavelength while the main light emitting signal is applied, and outputs light having a second wavelength longer than the first wavelength while the sub-signal is applied.

7. The image display apparatus of claim 1, further comprising:
a module cover including a plurality of segments sequentially arranged in an up and down direction of the display panel in a rear of the display panel; and
a hot wire disposed within the module cover,
wherein in response to the temperature of the display panel being less than the reference temperature, the processor is configured to control the hot wire to be heated to increase the temperature of the display panel.

8. The image display apparatus of claim 7, wherein:
the hot wire comprises a plurality of sub-hot wires disposed within the plurality of segments, respectively, and
the processor is configured to control at least one of the plurality of sub-hot wires to be heated based on the temperature of the display panel.

9. The image display apparatus of claim 8, wherein:
each of the plurality of segments is included in one of a first segment group and a second segment group,
each of the segments included in the second segment group comprises at least one through hole formed to penetrate a side opposite to a side facing the display panel, and
the second segment group first moves to an inside of the housing before the first segment group in response to the display panel being rolled down.

10. A method of operating an image display apparatus including a rollable display panel wound or unwound from a roller, the method comprising:
detecting a temperature of a display panel of the image display apparatus based on a sensing value detected through a temperature sensor of the display apparatus;
in response to the temperature of the display panel being less than a reference temperature, applying a light emitting main signal to a first pixel group including some pixels of a first area of the display panel and a second pixel group including some pixels of a second area of the display panel; and
in response to the temperature of the display panel being equal to or greater than the reference temperature, controlling an operation of the roller to wind or unwind the display panel from the roller,
wherein the first area is first exposed to an outside of a housing of the image display apparatus before the second area when the display panel is rolled up.

11. The method of claim 10, further comprising:
in response to the temperature of the display panel being less than a first reference temperature, applying the light emitting main signal to a first pattern of pixels including the first pixel group and the second pixel group; and
in response to a preset first time elapsing from a timing at which the light emitting main signal is applied to the first pattern of pixels, applying the light emitting main signal to a second pattern of pixels including pixels other than the first group and the second group among the pixels of the display panel,
wherein the pixels included in the first pixel pattern and the second pixel pattern do not overlap.

12. The method of claim 11, further comprising:
in response to the temperature of the display panel being equal to higher than the first reference temperature and less than a second reference temperature higher than the first reference temperature, applying the light emitting main signal to a third pattern of pixels; and
in response to a preset second time elapsing, applying the light emitting main signal to a fourth pattern of pixels,
wherein the pixels included in the third and fourth pattern of pixels do not overlap, and
wherein a number of pixels included in the third and fourth pattern of pixels is smaller than a number of pixels included in the first and second pattern of pixels.

13. The method of claim 10,
wherein a number of pixels included in the first pixel group is greater than a number of pixels included in the second pixel group.

14. The method of claim 13, further comprising:
in response to a preset time elapsing from a timing at which the light emitting main signal is applied to the first and second pixel groups, applying the light emitting main signal to a third pixel group included in the first area and a fourth pixel group included in the second area,
wherein a number of pixels included in the third pixel group is greater than a number of pixels included in the fourth pixel group,
wherein the pixels included in the first pixel group and the third pixel group do not overlap, and
wherein the pixels included in the second pixel group and the fourth pixel group do not overlap.

15. The method of claim 10, further comprising:
in response to the temperature of the display panel being the reference temperature or higher, applying a sub-signal to at least one of the plurality of pixels until the processor controls an operation of the roller to wind or unwind the display panel, and
wherein the display panel outputs light having a first wavelength while the main light emitting signal is applied, and outputs light having a second wavelength longer than the first wavelength while the sub-signal is applied.

16. The method of claim 10, further comprising:

in response to the temperature of the display panel being less than the reference temperature, controlling a hot wire disposed within a module cover to be heated to increase the temperature of the display panel, wherein the module cover includes a plurality of segments sequentially arranged in an up and down direction of the display panel in a rear of the display panel.

17. The method of claim 16, wherein:

the hot wire comprises a plurality of sub-hot wires disposed within the plurality of segments, respectively, and the method further comprises controlling at least one of the plurality of sub-hot wires to be heated based on the temperature of the display panel.

18. The method of claim 17, wherein:

each of the plurality of segments is included in one of a first segment group and a second segment group, each of the segments included in the second segment group comprises at least one through hole formed to penetrate a side opposite to a side facing the display panel, and the second segment group first moves to an inside of the housing before the first segment group in response to the display panel being rolled down.

* * * * *